US012802272B2

(12) United States Patent
Chen et al.

(10) Patent No.: US 12,802,272 B2
(45) Date of Patent: Nov. 17, 2026

(54) DATA PROCESSING

(71) Applicant: Tencent Technology (Shenzhen) Company Limited, Shenzhen (CN)

(72) Inventors: Fasheng Chen, Shenzhen (CN); Zhiyang Lin, Shenzhen (CN); Lei Sun, Shenzhen (CN); Rujian Wang, Shenzhen (CN); Xiangguang Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 318 days.

(21) Appl. No.: 18/584,684

(22) Filed: Feb. 22, 2024

(65) Prior Publication Data

US 2024/0202975 A1 Jun. 20, 2024

Related U.S. Application Data

(63) Continuation of application No. PCT/CN2023/092217, filed on May 5, 2023.

(30) Foreign Application Priority Data

May 10, 2022 (CN) ......................... 202210500935.0

(51) Int. Cl.
*G06T 7/80* (2017.01)
*G06T 7/73* (2017.01)
*G06V 10/10* (2022.01)

(52) U.S. Cl.
CPC .................. *G06T 7/80* (2017.01); *G06T 7/73* (2017.01); *G06V 10/19* (2022.01)

(58) Field of Classification Search
CPC ... G06T 7/80; G06T 7/73; G06T 2207/30204; G06T 2207/30244; G06T 7/13; G06V 10/19
See application file for complete search history.

(56) References Cited

U.S. PATENT DOCUMENTS

2010/0134634 A1* 6/2010 Witt ..................... H04N 5/2224 348/181
2015/0043806 A1* 2/2015 Karsch .................... G06T 15/50 382/154

(Continued)

FOREIGN PATENT DOCUMENTS

CN 114596368 A 6/2022

OTHER PUBLICATIONS

International Search Report and Written Opinion received for PCT Patent Application No. PCT/CN2023/092217, mailed on Jul. 26, 2023, 15 pages (5 pages of English Translation and 10 pages of Original Document).

*Primary Examiner* — Bobbak Safaipour
(74) *Attorney, Agent, or Firm* — ARENTFOX SCHIFF LLP

(57) ABSTRACT

A method includes obtaining an image of a spatial object in a space. The spatial object is captured in the image by a camera component. The image includes one or more captured planar regions corresponding to one or more planes of the spatial object. A first captured planar region of the one or more captured planar regions includes an array of first captured identification codes and includes first captured straight lines associated with the first captured identification codes. The first captured straight lines in the image are associated with a first vanishing point. The method further includes identifying the first captured identification codes, identifying the first captured straight lines, determining first equations of the first captured straight lines, determining, coordinates of the first vanishing point, and determining one or more intrinsic parameters of the camera component based on at least the first vanishing point.

19 Claims, 18 Drawing Sheets

(56) References Cited

U.S. PATENT DOCUMENTS

| | | | | |
|---|---|---|---|---|
| 2020/0090338 | A1* | 3/2020 | Fiala | A63F 13/213 |
| 2022/0051429 | A1* | 2/2022 | Thong | B60R 1/24 |
| 2024/0169568 | A1* | 5/2024 | Fan | G06T 7/50 |
| 2026/0057545 | A1* | 2/2026 | Zheng | G06T 7/536 |

* cited by examiner

1500

DATA PROCESSING

RELATED APPLICATIONS

The present application is a continuation of International Application No. PCT/CN2023/092217, filed on May 5, 2023 and entitled "DATA PROCESSING METHOD AND APPARATUS, COMPUTER DEVICE, STORAGE MEDIUM, AND PROGRAM PRODUCT", which claims priority to Chinese Patent Application No. 202210500935.0, filed on May 10, 2022 and entitled "DATA PROCESSING METHOD AND APPARATUS, COMPUTER DEVICE, STORAGE MEDIUM, AND PROGRAM PRODUCT". The entire disclosures of the prior applications are hereby incorporated by reference.

FIELD OF THE TECHNOLOGY

This application relates to the field of computer technologies, including a data processing method and apparatus, a computer device, a storage medium, and a program product.

BACKGROUND OF THE DISCLOSURE

Currently, during calibration of an intrinsic component parameter (that is, an intrinsic camera parameter) of a camera component, a calibration board (that is, a shot object) needs to be captured from a plurality of angles by using the camera component, and then the intrinsic component parameter of the camera component is generated based on a plurality of images captured from the plurality of angles. Alternatively, video shooting needs to be performed on the calibration board by using the camera component, and then the intrinsic component parameter of the camera component is generated based on a plurality of video frames captured from the shot video obtained through video shooting. However, the manner of generating the intrinsic component parameter through the plurality of captured images or the plurality of captured video frames requires time to process the plurality of images. Therefore, a speed of calibrating the intrinsic component parameter is increased.

In addition, in the related art, a hardware device (for example, a focus follower) may further be installed in the camera component, and the intrinsic component parameter of the camera component may be directly read by using the hardware device. However, the hardware device is very expensive, and installation and deployment are very troublesome, which increases the costs of calibrating the intrinsic component parameter.

SUMMARY

Embodiments of this disclosure provide a data processing method and apparatus, a computer device, a non-transitory computer-readable storage medium, and a program product, which helps improve efficiency of determining one or more intrinsic camera parameters.

Some aspects of the disclosure provide a method of data processing. The method includes obtaining an image of a spatial object in a space, the spatial object is captured in the image by a camera component, the image includes one or more captured planar regions corresponding to one or more planes of the spatial object, a first captured planar region of the one or more captured planar regions includes an array of first captured identification codes that are individually identifiable and includes first captured straight lines, the first captured straight lines are associated with the first captured identification codes according to a first mapping relationship, the first captured straight lines in the image are associated with a first vanishing point. The method further includes identifying the first captured identification codes from the image, identifying the first captured straight lines in the image based on the first mapping relationship, determining first equations of the first captured straight lines in the image based on coordinates of captured points on the first captured straight lines in the image, determining, based on the first equations of the first captured straight lines, coordinates of the first vanishing point, and determining one or more intrinsic parameters of the camera component based on at least the first vanishing point. Apparatus and non-transitory computer-readable storage medium counterpart embodiments are also contemplated.

An aspect of the embodiments of this disclosure provides a non-transitory computer-readable storage medium, the computer-readable storage medium storing instructions which executed by a processor cause the processor to perform the method provided in the embodiments of this disclosure.

An aspect of the embodiments of this disclosure provides a computer program product or a computer program, the computer program product including a computer program, the computer program being stored in a computer-readable storage medium. The processor of the computer device reads the computer program from the computer-readable storage medium. The processor executes the computer program, causing the computer device to perform the method provided in the embodiments of this disclosure.

BRIEF DESCRIPTION OF THE DRAWINGS

To describe the technical solutions in embodiments of this disclosure more clearly, the following briefly describes the accompanying drawings required for describing the embodiments.

DESCRIPTION OF EMBODIMENTS

The technical solutions in embodiments of this disclosure are described below with reference to the accompanying drawings in the embodiments of this disclosure. The described embodiments are merely some rather than all of the embodiments of this disclosure. Other embodiments are within the scope of the present disclosure.

Figure 1:
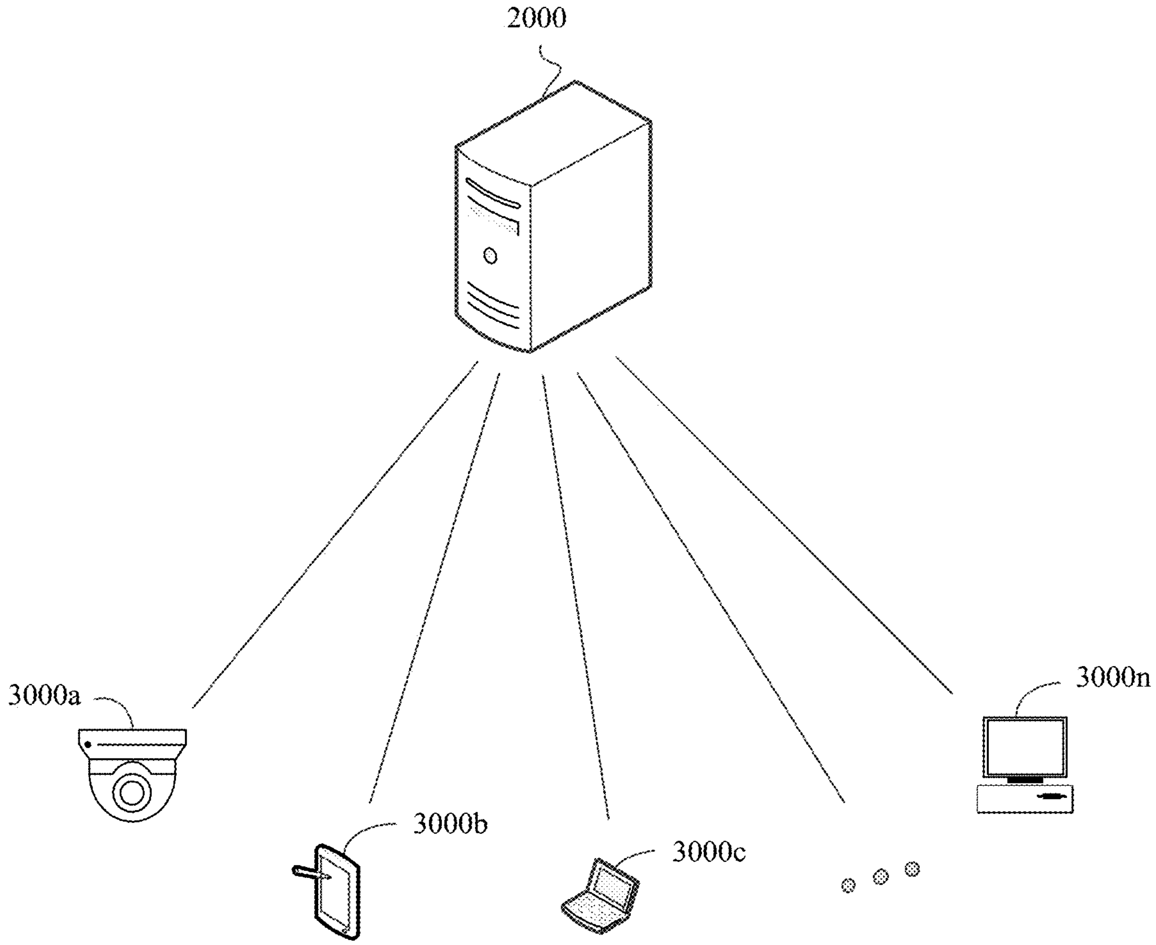
FIG. 1 is a schematic structural diagram of a network architecture according to an embodiment of this disclosure.

FIG. 1 is a schematic structural diagram of a network architecture according to an embodiment of this disclosure. As shown in FIG. 1, the network architecture may include a server 2000 and a terminal device cluster. The terminal device cluster may specifically include one or more terminal devices, and a quantity of terminal devices in the terminal device cluster is not limited herein. As shown in FIG. 1, the plurality of terminal devices may specifically include a terminal device 3000*a*, a terminal device 3000*b*, a terminal device 3000*c*, . . . , and a terminal device 3000*n*. The terminal device 3000*a*, the terminal device 3000*b*, the terminal device 3000*c*, . . . , and the terminal device 3000*n* may perform direct or indirect network connection with the server 2000 through wired or wireless communication, respectively, so that each terminal device may perform data interaction with the server 2000 through the network connection.

Each terminal device in the terminal device cluster may include: an intelligent terminal having a data processing function such as a smart phone, a tablet computer, a notebook computer, a desktop computer, a smart home appliance, a wearable device, an onboard terminal, an intelligent voice interaction device, and a camera. For ease of understanding, in this embodiment of this disclosure, a terminal device may be selected as a target terminal device from the plurality of terminal devices shown in FIG. 1. For example, in this embodiment of this disclosure, the terminal device 3000*b* shown in FIG. 1 may be used as the target terminal device.

The server 2000 may be an independent physical server, or may be a server cluster formed by a plurality of physical servers or a distributed system, and may further be a cloud server that provides basic cloud computing services such as cloud service, a cloud database, cloud computing, a cloud function, cloud storage, a network service, cloud communication, a middleware service, a domain name service, a security service, a CDN, and a big data and artificial intelligence platform.

It is to be understood that the target terminal device may be integrated with a camera component for capturing a target image associated with a spatial object. The camera component herein may be a camera component for capturing a photo or a video on the target terminal device, for example, a camera. A plurality of camera components may be integrated and installed on a target terminal device. The spatial object may be a two-dimensional code green screen, and the two-dimensional code green screen represents a green screen printed with a two-dimensional code. In some embodiments, the spatial object may further be a checkerboard green screen, and the checkerboard green screen represents a green screen printed with a rectangular box in a solid color (for example, black). In addition, the spatial object may further include a to-be-shot subject (for example, a lion). It is to be understood that this embodiment of this disclosure is described by using an example in which the spatial object is the two-dimensional code green screen.

The two-dimensional code green screen may be three surfaces: left wall+right wall+ground. In some embodiments, the two-dimensional code green screen may alternatively be any one surface of the left wall+right wall+the ground, and the two-dimensional code green screen may further be any two surfaces of the left wall+right wall+the ground. All two-dimensional codes in the two-dimensional code green screen have unique patterns and serial numbers, which may be detected in the target image by using an identification code detection algorithm (for example, a two-dimensional code detection algorithm), and coordinates of corners of the two-dimensional codes on the target image can be accurately obtained. For a single two-dimensional code, four vertices formed by a frame (that is, a bounding rectangle of the two-dimensional code) of the two-dimensional code may be referred to as corners of the two-dimensional code, and four edges of a quadrilateral defined by the four corners of the two-dimensional code are an upper edge, a lower edge, a left edge, and a right edge.

It is to be understood that in this disclosure, the two-dimensional code that can be correctly identified by using the two-dimensional code detection algorithm may be referred to as an observable two-dimensional code. It is to be understood that when the two-dimensional code is blocked, the two-dimensional code is not clear, or a part of the two-dimensional code exceeds a picture boundary of the target image, the two-dimensional code detection algorithm cannot be used to detect the two-dimensional code. In this case, the two-dimensional code is not regarded as the observable two-dimensional code.

For ease of understanding, in this disclosure, the two-dimensional code in the two-dimensional code green screen may be referred to as an identification code. In an embodiment, the upper edge, the lower edge, the left edge, and the right edge of the two-dimensional code may be collectively referred to as corresponding spatial line segments of the identification code in this disclosure. The two-dimensional code corner of the two-dimensional code may be referred to as a space corner in this disclosure.

It is to be understood that the foregoing network architecture may be applied to the field of virtual-real fusion, for example, virtual-real fusion in video production (virtual production), live streaming, and post-video special effects. The virtual-real fusion means that a real to-be-shot subject is incorporated into a virtual scene. Compared with a conventional method that involves entirely real shooting, the virtual-real fusion can allow for easy scene replacement, greatly reduce the costs of setting up scenes (the virtual-real fusion requires only a green screen), and can provide impressively cool environmental effects. In addition, the virtual-real fusion is also highly consistent with concepts such as virtual reality (VR), metaverse, and the Complete Reality of Internet, which can provide a very basic ability to incorporate a real person into the virtual scene.

It may be understood that the target terminal device may shoot a real scene through the camera component (that is, a real lens), obtain the virtual scene from the server 2000, and fuse the virtual scene with the real scene to obtain a fusion scene. The virtual scene may be a scene synthesized directly by the server 2000, or may be a scene obtained by the server 2000 from another terminal device other than the target terminal device. Another terminal device other than the target terminal device may shoot the virtual scene through the camera component (that is, a virtual lens).

According to the virtual-real fusion method in this disclosure, the camera component needs to be calibrated before the shooting to ensure correct visual perception of the subsequently synthesized picture (a correct perspective relationship). To ensure the correct perspective relationship between the virtual scene and the real scene, the target terminal device needs to ensure that intrinsic component parameters respectively corresponding to the virtual scene and the real scene (that is, intrinsic camera parameters) match. Therefore, the intrinsic component parameter of the camera component in the target terminal device for the target image may be obtained by identifying the target image captured by the target terminal device, and then the intrinsic component parameter corresponding to the camera component may be adjusted. The to-be-shot object may be shot based on the camera component with the adjusted intrinsic component parameter, and finally the fusion scene having the correct perspective relationship is obtained. The intrinsic component parameter of the camera component is an intrinsic camera parameter, and the intrinsic camera parameter may include but is not limited to an optical center and a focal length.

Figure 2A:
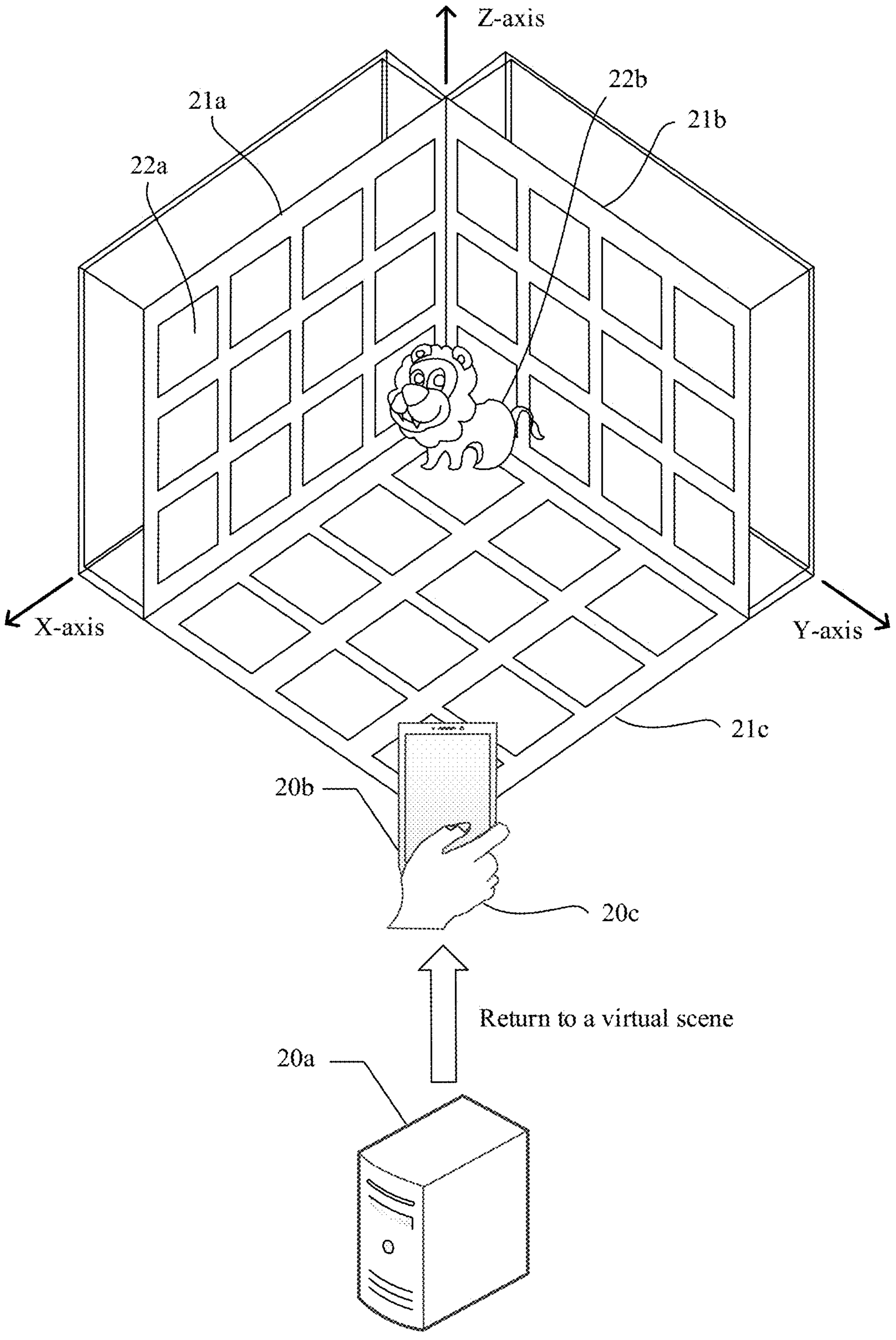
FIG. 2*a* is a schematic diagram I of a scene for data interaction according to an embodiment of this disclosure.
Figure 2B:
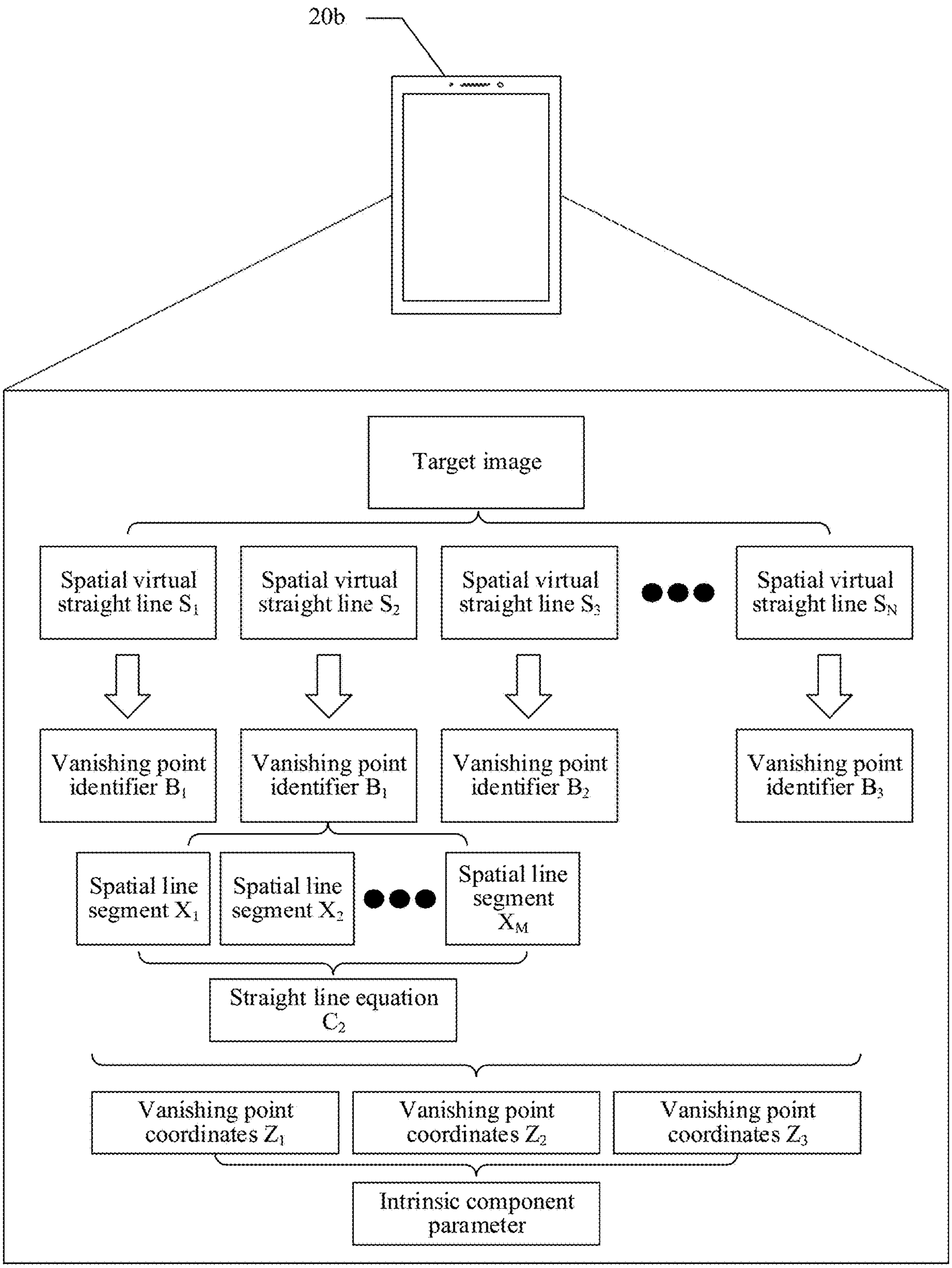
FIG. 2*b* is a schematic diagram II of a scene for data interaction according to an embodiment of this disclosure.
Figure 2C:
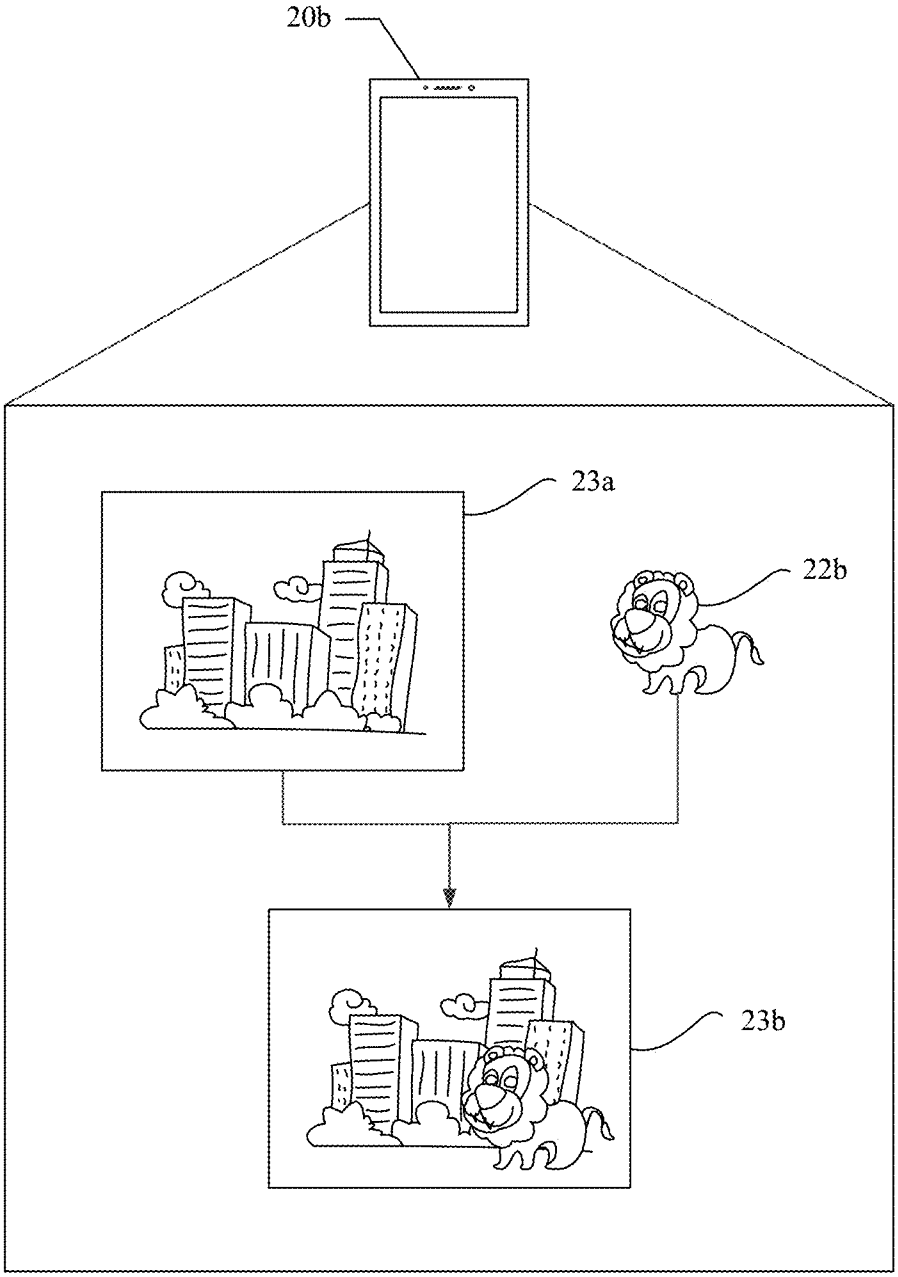
FIG. 2*c* is a schematic diagram III of a scene for data interaction according to an embodiment of this disclosure.

For ease of understanding, further, FIG. 2*a* is a schematic diagram I of a scene for data interaction according to an embodiment of this disclosure, FIG. 2*b* is a schematic diagram II of a scene for data interaction according to an embodiment of this disclosure, and FIG. 2*c* is a schematic diagram III of a scene for data interaction according to an embodiment of this disclosure. A server 20*a* shown in FIG. 2*a* may be the server 2000 in the embodiment corresponding to FIG. 1, and a terminal device 20*b* shown in FIG. 2*a*, FIG. 2*b*, and FIG. 2*c* may be the target terminal device in the embodiment corresponding to FIG. 1. A user corresponding to the target terminal device may be an object 20*c*, and the target terminal device is integrated with a camera component.

As shown in FIG. 2*a*, the object 20*c* may shoot a spatial object through the camera component in the terminal device 20*b* to obtain a target image. The target image may be a photo directly captured by a shooting component, or may be an image captured from a video shot by the shooting component. The spatial object may include two planar regions or three planar regions among a left wall 21*a*, a right wall 21*b*, and a ground region 21*c*. A to-be-shot subject 22*b* may be a lion standing on the ground region 21*c*. An aluminum alloy support may be mounted behind the left wall 21*a* and the right wall 21*b*, and the left wall 21*a* and the right wall 21*b* are supported by the aluminum alloy support.

The planar region of the spatial object corresponds to at least two coordinate axes, every two of the at least two coordinate axes are used to form a spatial plane (that is, a plane where the left wall 21*a*, the right wall 21*b*, and the ground region 21*c* are located), and every two coordinate axes are perpendicular to each other. As shown in FIG. 2*a*, the spatial object may correspond to three coordinate axes. The three coordinate axes may be specifically an x-axis, a y-axis, and a z-axis. Every two of the three coordinate axes may be used to form a spatial plane. The x-axis and the z-axis may be used to form the spatial plane formed by the left wall 21*a*. The y-axis and the z-axis may be used to form the spatial plane where the right wall 21*b* is located. The x-axis and the y-axis may be used to form the spatial plane where the ground region 21*c* is located. The planar region includes an array of combinations of identification codes of the same size. An edge contour of the identification codes is rectangular. For example, the left wall 21*a* may include an identification code 22*a*, and FIG. 2*a* shows the edge contour corresponding to the identification code 22*a*. It is to be understood that a quantity of identification codes in the spatial plane is not limited in the embodiments of this disclosure.

As shown in FIG. 2*b*, the terminal device 20*b* may obtain, from the target image after capturing the target image, a straight line formed by extending spatial line segments of the identification codes (that is, edges of the identification codes). For example, the straight line may be referred to as a spatial virtual straight line. For example, upper edges of the identification codes of the same row in the array may be extended to form a spatial virtual straight line, and a quantity of spatial virtual straight lines may be N. N may be a positive integer herein, and N spatial virtual straight lines may specifically include: a spatial virtual straight line $S_1$, a spatial virtual straight line $S_2$, a spatial virtual straight line $S_3$, . . . , and a spatial virtual straight line $S_N$.

Further, the terminal device 20*b* may assign straight line identifiers (which may alternatively be referred to as identifiers of straight lines) to N spatial virtual straight lines, and the straight line identifiers of the spatial virtual straight line are used as line segment identifiers of the spatial line segments. For example, the straight line identifiers assigned by the terminal device 20*b* to the spatial virtual straight line $S_2$ may be a straight line identifier K. In this way, when the spatial line segments on the spatial virtual straight line $S_2$ are a spatial line segment $X_1$, a spatial line segment $X_2$, . . . , and a spatial line segment $X_M$, the terminal device 20*b* uses the straight line identifier K as the line segment identifier of the spatial line segment $X_1$, the spatial line segment $X_2$, . . . , and the spatial line segment $X_M$. To be specific, the line segment identifier of the spatial line segment $X_1$, the spatial line segment $X_2$, . . . , and the spatial line segment Xx is the straight line identifier K (that is, a line segment identifier K).

As shown in FIG. 2*b*, the terminal device 20*b* may determine vanishing point identifiers respectively mapped by the N spatial virtual straight lines. One vanishing point identifier corresponds to one vanishing point, and a quantity of vanishing points is, for example, 2 or 3. The vanishing point represents a visual intersection point of parallel lines in the real world in the image. To be specific, an intersection point of the spatial virtual straight line in the target image may be referred to as the vanishing point in the embodiments of this disclosure. For example, the terminal device 20*b* may determine that a vanishing point identifier mapped by the spatial virtual straight line $S_1$ is a vanishing point identifier $B_1$, a vanishing point identifier mapped by the spatial virtual straight line $S_2$ is a vanishing point identifier $B_1$, a vanishing point identifier mapped by the spatial virtual straight line $S_3$ is a vanishing point identifier $B_2$, . . . , and a vanishing point identifier mapped by the spatial virtual straight line $S_N$ is a vanishing point identifier $B_3$.

As shown in FIG. 2*b*, the terminal device 20*b* may generate a straight line equation of a spatial virtual straight line based on the line segment identifier and corner coordinates of a space corner in the spatial line segment. For example, the terminal device 20*b* may generate a straight line equation C2 of the spatial virtual straight line $S_2$ based on the line segment identifier K of the spatial line segment $X_1$, the spatial line segment $X_2$, . . . , and the spatial line segment $X_M$, and the corner coordinates of space corners in the spatial line segment $X_1$, the spatial line segment $X_2$, . . . , and the spatial line segment $X_M$. The straight line identifier of the spatial virtual straight line $S_2$ is the straight line identifier K.

Further, the terminal device 20*b* may generate, based on the vanishing point identifier and the straight line equation, vanishing point coordinates of the vanishing point indicated by the vanishing point identifier. Specifically, the terminal device 20*b* may generate, based on the vanishing point identifier and the straight line equation of the spatial virtual straight line mapped by the vanishing point identifier, the vanishing point coordinates of the vanishing point indicated by the vanishing point identifier. For example, the terminal device 20*b* may generate, based on the straight line equation of the spatial virtual straight line (the spatial virtual straight line mapped by the vanishing point identifier $B_1$ includes the spatial virtual straight line $S_1$ and the spatial virtual straight line $S_2$) mapped by the vanishing point identifier $B_1$, the vanishing point coordinates of the vanishing point indicated by the vanishing point identifier $B_1$. The vanishing point coordinates of the vanishing point indicated by the vanishing point identifier $B_1$ may be vanishing point coordinates $Z_1$. Similarly, the vanishing point coordinates of the vanishing point indicated by the vanishing point identifier $B_2$ may be vanishing point coordinates $Z_2$, and the vanishing point coordinates of the vanishing point indicated by the vanishing point identifier $B_3$ may be vanishing point coordinates $Z_3$.

As shown in FIG. 2*b*, the terminal device 20*b* may determine an intrinsic component parameter of the camera component in the terminal device 20*b* for the target image based on the vanishing point coordinates $Z_1$, the vanishing point coordinates $Z_2$, and the vanishing point coordinates $Z_3$. In the meanwhile, as shown in FIG. 2*a*, the terminal device 20*b* may further obtain a virtual scene for virtual-real fusion from the server 20*a*, where the virtual scene herein may be a virtual scene 23*a* shown in FIG. 2*c*.

As shown in FIG. 2*c*, after the terminal device 20*b* determines the intrinsic component parameter of the camera component in the terminal device 20*b* for the target image and obtains the virtual scene 23*a* from the server 20*a*, a to-be-shot subject 22*b* in the target image may be incorporated into the virtual scene 23*a* based on the intrinsic component parameter, to obtain a fusion scene 23*b* having a correct perspective relationship.

It may be seen that in this embodiment of this disclosure, a single target image captured by the camera component may be processed, spatial virtual straight lines parallel to the x-axis, the y-axis, and the z-axis in the target image are obtained in real time, the vanishing point of each group of parallel lines is accurately calculated, and then the intrinsic component parameter of the camera component is calibrated based on the vanishing point coordinates of the vanishing point formed by the spatial virtual straight line. In this embodiment of this disclosure, the intrinsic component parameter of the camera component may be determined by using the single image without processing a plurality of images and without using a hardware device to calibrate the intrinsic component parameter, which may significantly reduce the costs of calibrating the intrinsic component parameter and improve efficiency of calibration.

The virtual-real fusion requires calibration of the camera component. In this embodiment of this disclosure, in collaboration with a shooting technique in which the spatial object can support real-time optical zoom (for example, Hitchcock zoom), a video with an impressively cool picture effect can be produced, thereby improving viewing experience of the virtual-real fusion and attracting more users. In addition, according to this disclosure, hardware costs of supporting optical zoom may be greatly reduced while clarity is ensured, and a hardware threshold can be reduced. A mobile phone, an ordinary camera, and a professional camera may all be used. Installation, deployment, and operation are simple, and a threshold for users to use is lowered to attract more video production users. In the meanwhile, the spatial object can further assist in image matting and camera movement.

Figure 3:
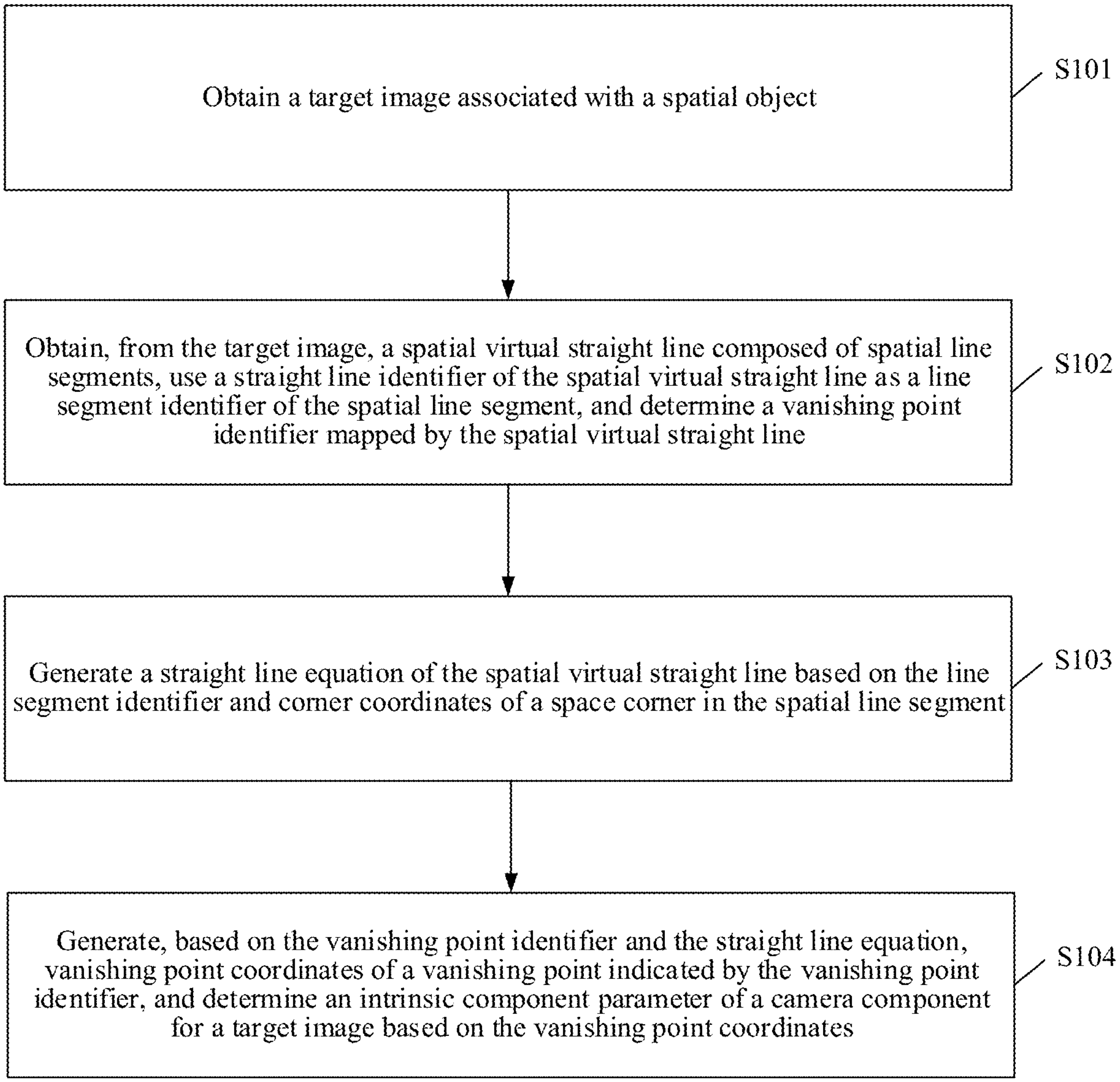
FIG. 3 is a schematic flowchart I of a data processing method according to an embodiment of this disclosure.

Further, FIG. 3 is a schematic flowchart I of a data processing method according to an embodiment of this disclosure. The method may be performed by a server, or may be performed by a terminal device, and may further be performed by both the server and the terminal device. The server may be the server 20*a* in the embodiment corresponding to FIG. 2*a*, and the terminal device may be the terminal device 20*b* in the embodiment corresponding to FIG. 2*a*. For ease of understanding, in the embodiments of this disclosure, an example in which the method is performed by the terminal device is used for description. The data processing method may include the following step S101 to step S104:

Step S101: Obtain a target image associated with a spatial object.

The target image is obtained by capturing the spatial object by a shooting component. The spatial object includes an array composed of identification codes. A bounding rectangle of the identification code may be regarded as an outline of the identification code, including 4 edges. In short, the identification code may include 4 edges, that is, 4 spatial line segments. Therefore, the target image may alternatively include at least part of the identification code in the array, and the identification code in the target image that may be detected by using an identification code detection algorithm is an observable identification code (for example, an observable two-dimensional code).

Step S102: Obtain, from the target image, a spatial virtual straight line composed of spatial line segments, use a straight line identifier of the spatial virtual straight line as the line segment identifier of the spatial line segment, and determine a vanishing point identifier mapped by the spatial virtual straight line.

It may be understood that the terminal device may use the identification code detection algorithm to identify the identification code in the target image, and then connect spatial line segments in the identification code that are in the same row and on the same side of the array (for example, spatial line segments on an upper side of each of the identification codes in a row, that is, upper edges of the identification codes in the same row), and obtain the spatial virtual straight line by extending the connected spatial line segments. For another example, the spatial line segments in the identification code that are in the same column and on the same side of the array (for example, a left side of each identification code in a row) are connected, and the spatial virtual straight line is obtained by extending the connected spatial line segments. In addition, when the identification code in the target image is identified, the terminal device may generate corner coordinates of a space corner in the identification code in the target image.

It is to be understood that the identification code detection algorithm may be any open source algorithm, for example, an ArUco (Augmented Reality University of Cordoba) identification code detection algorithm in opencv (a crossplatform computer vision and machine learning software library released based on the Apache 2.0 license (open source)). The execution process of the ArUco identification code detection algorithm is candidate box detection, quadrilateral identification, target filtering, and corner correction. After the detection by using the identification code detection algorithm, the identifiers of all observable identification codes (that is, unit code identifiers) and two-dimensional coordinates of four space corners of each observable identification code may be obtained.

It may be understood that the terminal device may assign the unit code identifier to the identification code, and store, in a first table (that is, a table $T_1$), the unit code identifier in association with the line segment identifier of the spatial line segment included in the identification code. Therefore, the table $T_1$ may be used to query for the line segment identifier (that is, the straight line identifier) of the spatial line segment that forms the identification code through the unit code identifier. A unit code identifier may be used to find the four line segment identifiers respectively corresponding to the straight line where the upper edge is located, the straight line where a lower edge is located, the straight line where a left edge is located, and the straight line where a right edge is located. To be specific, a unit code identifier may be used to find the straight line identifiers of the spatial virtual straight lines to which the straight line where the upper edge is located, the straight line where the lower edge is located, the straight line where the left edge is located, and the straight line where the right edge is located respectively belong.

It may be understood that the terminal device may store, in a second table (that is, a table $T_2$), the straight line identifier of the spatial virtual straight line in association with the vanishing point identifier mapped by the spatial virtual straight line. Therefore, the table $T_2$ may be used to query for the vanishing point identifier by using the straight line identifier, and one vanishing point identifier may be found by using one straight line identifier. The terminal device may divide the spatial virtual straight line into three groups of spatial virtual straight lines perpendicular to each other based on the x-axis, y-axis, and z-axis. Each group of spatial virtual straight lines correspond to a vanishing point identifier.

Figure 4:
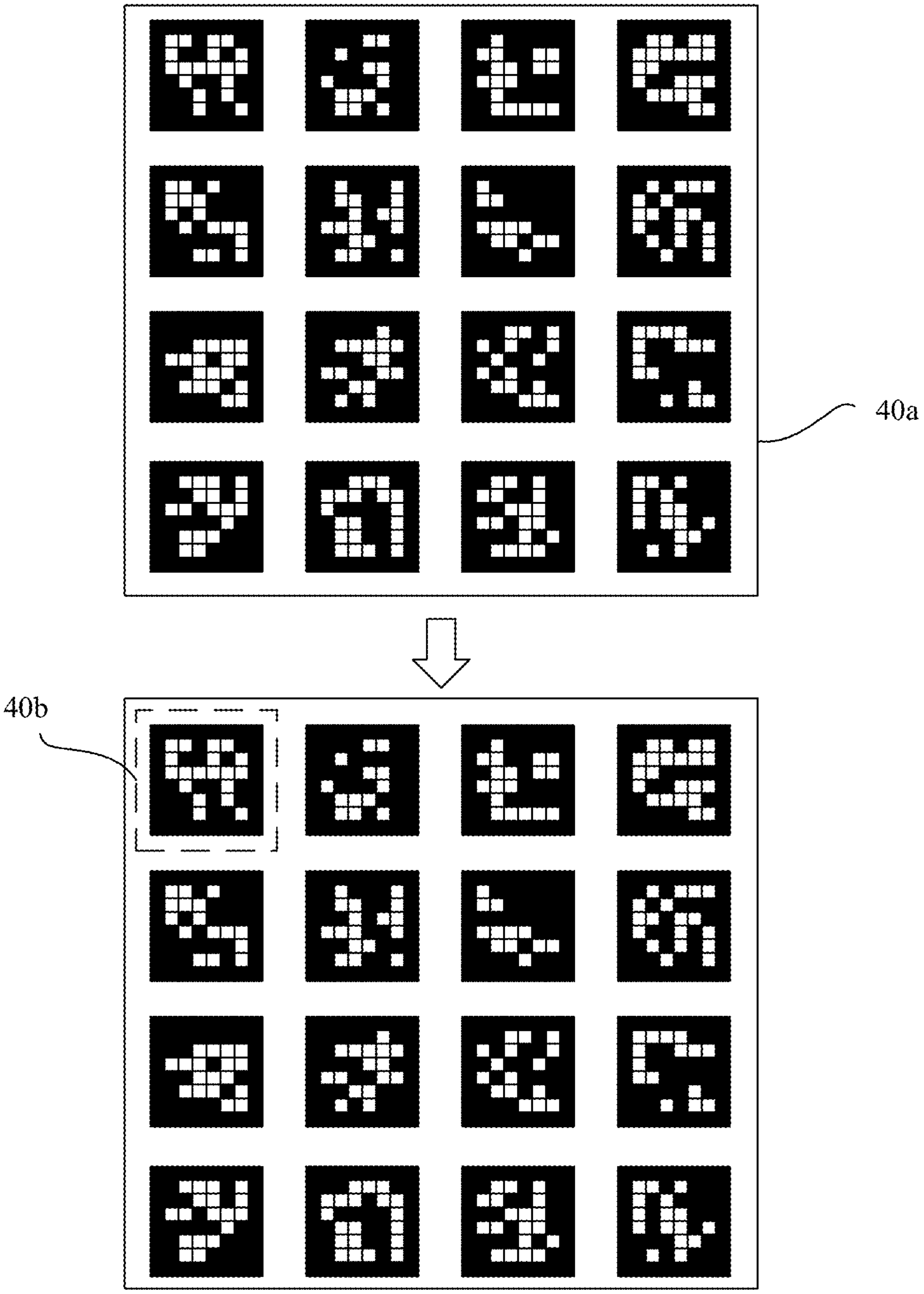
FIG. 4 is a schematic diagram of a scene for identifying an identification code according to an embodiment of this disclosure.

For ease of understanding, FIG. 4 is a schematic diagram of a scene for identifying an identification code according to an embodiment of this disclosure. A spatial plane 40*a* shown in FIG. 4 may be a spatial plane formed by any two coordinate axes corresponding to the spatial object, and a square formed by a dark region in the spatial object 40*a* is the identification code. The identification code may be detected from the spatial plane 40*a* by using an identification code detection algorithm, and the detected identification code may be marked by a rectangular frame. For example, the identification code detected from the spatial plane 40*a* may be an identification code 40*b*.

Step S103: Generate a straight line equation of a spatial virtual straight line based on a line segment identifier and corner coordinates of a space corner in a spatial line segment.

Specifically, the terminal device may determine, based on the line segment identifier, the spatial virtual straight line to which the spatial line segment belongs, and use the corner coordinates of the space corner in the spatial line segment as key point coordinates on the spatial virtual straight line. Further, the terminal device may generate the straight line equation of the spatial virtual straight line based on the key point coordinates.

It may be understood that the terminal device may obtain one or more spatial planes composed of spatial coordinate axes corresponding to a target image, determine a maximum quantity of identification codes in the target image based on the one or more spatial planes, and determine a maximum quantity of key points corresponding to the spatial virtual straight line based on the maximum quantity of identification codes.

Further, the terminal device may generate a straight line fitting matrix based on the maximum quantity of key points and a straight line quantity of spatial virtual straight lines, and store, in the straight line fitting matrix, the straight line identifier of the spatial virtual straight line in association with the key point coordinates on the spatial virtual straight line. The straight line fitting matrix may be expressed as $D_{line}$, the straight line fitting matrix $D_{line}$ is a two-dimensional matrix, a height of the matrix is a quantity of all spatial virtual straight lines, that is, $N_{max}$=4*(a+b+c), a width is N, and each element in the straight line fitting matrix $D_{line}$ is a pair of real number coordinates. A row represents two-dimensional coordinates of space corners on a spatial virtual straight line. The straight line fitting matrix $D_{line}$ may be used to perform the step of generating the straight line equation of the spatial virtual straight line based on the key point coordinates in step S103.

The terminal device needs to initialize each element in the straight line fitting matrix $D_{line}$ before obtaining the key point coordinates on the spatial virtual straight line. For example, in this embodiment of this disclosure, each element in the straight line fitting matrix $D_{line}$ may be initialized to [−1, −1]. It is to be understood that an initialized value of each element in the straight line fitting matrix $D_{line}$ is not limited in this embodiment of this disclosure.

It may be understood that the terminal device may generate a straight line equation storage matrix based on the straight line quantity of spatial virtual straight lines and a quantity of straight line parameters in the straight line equation, and store, in the straight line equation storage matrix, the straight line identifier of the spatial virtual straight line in association with the straight line parameters corresponding to the spatial virtual straight lines. The straight line equation storage matrix may be expressed as $D_{point}$, the straight line equation storage matrix $D_{point}$ is a two-dimensional matrix, a height of the matrix is a quantity of all spatial virtual straight lines, that is, $N_{max}$=4*(a+b+c), a width is 3, and each element in the straight line equation storage matrix $D_{point}$ is a real number. A row represents straight line parameters in the straight line equation of a spatial virtual straight line, and a straight line equation of a spatial virtual straight line may be determined by using three straight line parameters. The straight line equation storage matrix $D_{point}$ may be used to perform the step of generating, based on the vanishing point identifier and the straight line equation, the vanishing point coordinates of the vanishing point indicated by the vanishing point identifier in step S104.

The terminal device needs to initialize each element in the straight line equation storage matrix $D_{point}$ before obtaining the straight line parameter in the straight line equation. For example, in this embodiment of this disclosure, each element in the straight line equation storage matrix $D_{point}$ may be initialized to −1. It is to be understood that an initialized value of each element in the straight line equation storage matrix $D_{point}$ is not limited in this embodiment of this disclosure.

In this embodiment of this disclosure, a plane (a right wall) perpendicular to an x-axis may be referred to as a plane x, a plane (a left wall) perpendicular to a y-axis may be referred to as a plane y, and a plane (the ground) perpendicular to a z-axis may be referred to as a plane z. c (a z-axis direction) times b (a y-axis direction) identification codes exist on the plane x, c (the z-axis direction) times a (an x-axis direction) identification codes exist on the plane y, and a (the x-axis direction) times b (the y-axis direction) identification codes exist on the plane z. The maximum quantity of identification codes may be expressed as max (a, b, c), and the maximum quantity of key points (that is, N) may be expressed as N=2*max (a, b, c). It may be understood that the maximum quantity of key points may represent a maximum quantity of space corners on the spatial virtual straight line, or may represent a maximum quantity of spatial virtual straight lines that may be used for a single vanishing point.

For ease of understanding, an example in which quantities of identification codes for the plane x and the plane y in the z-axis direction are both c is used for description in this embodiment of this disclosure, an example in which quantities of identification codes for the plane z and the plane x in the y-axis direction are both b is used for description in this embodiment of this disclosure, and an example in which quantities of identification codes for the plane z and the plane y in the x-axis direction are both a is used for description in this embodiment of this disclosure.

In some embodiments, the quantities of identification codes for the plane x and the plane y in the z-axis direction may be different, the quantities of identification codes for the plane z and the plane x in the y-axis direction may be different, and the quantities of identification codes for the plane z and the plane y in the x-axis direction may be different. In this case, c represents a larger value of the quantities of identification codes for the plane x and the plane y in the z-axis direction, b represents a larger value of the quantities of identification codes for the plane z and the plane x in the y-axis direction, and a represents a larger value of the quantities of identification codes for the plane z and the plane y in the x-axis direction.

It may be understood that in this disclosure, calculation of the vanishing point coordinates may be accelerated based on table lookup, and the tables involved in this disclosure may include the table $T_1$, the table $T_2$, the straight line fitting matrix $D_{line}$, and the straight line equation storage matrix $D_{point}$. All of the identifiers involved in table creation, such as the unit code identifier, the straight line identifier, and the vanishing point identifier do not necessarily have to be labeled as described in this disclosure, and may also be labeled by using another labeling method.

Therefore, the initialization method in this embodiment of this disclosure may accelerate the speed of fitting the spatial virtual straight lines, avoid repeated scanning of the spatial virtual straight line to which a two-dimensional code corner belongs, and repeated occupation and release of internal memory. A maximum quantity N of points (that is, the maximum quantity of key points) on the spatial virtual straight line may be used to initialize internal memory space for fitting the straight lines, and allocate the maximum possible memory at one time.

Figure 5:
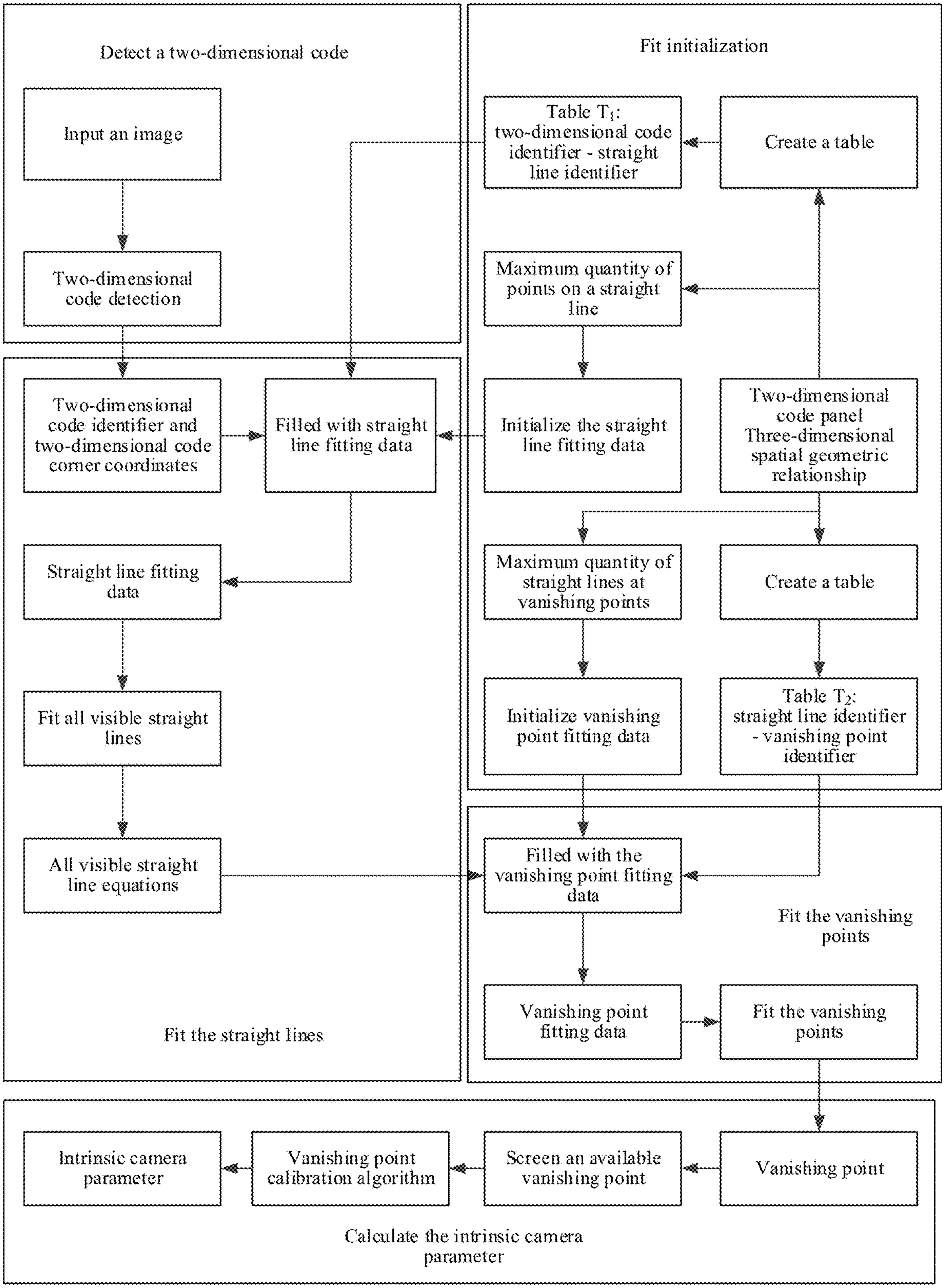
FIG. 5 is a schematic flowchart of determining an intrinsic component parameter according to an embodiment of this disclosure.
Figure 6:
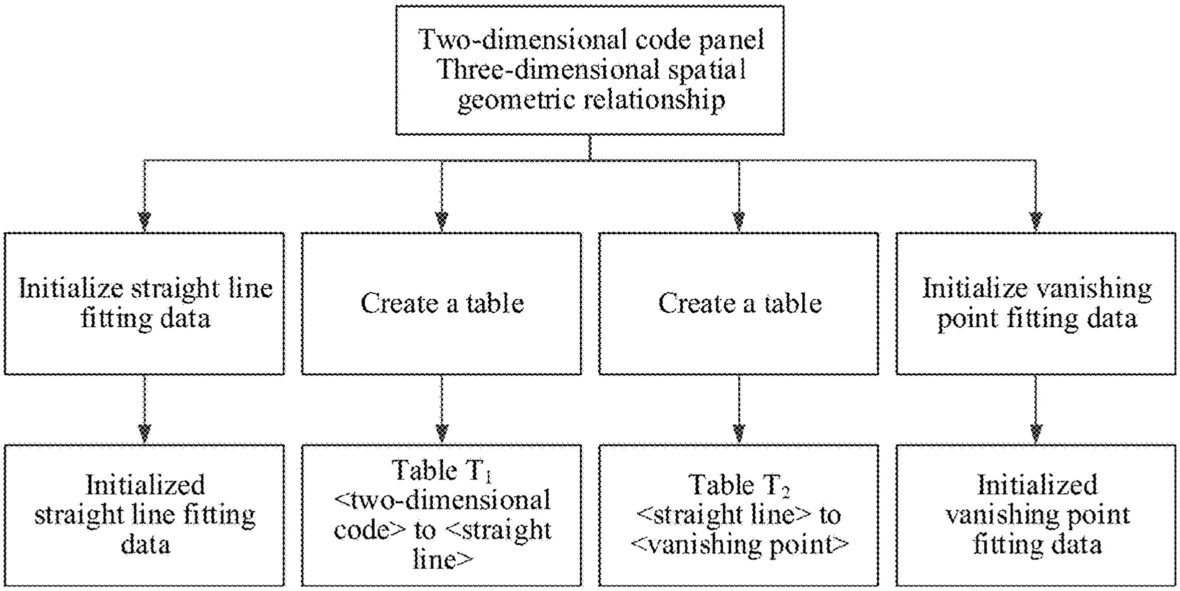
FIG. 6 is a schematic flowchart of internal memory preallocation according to an embodiment of this disclosure.

For ease of understanding, FIG. 6 is a schematic flowchart of internal memory preallocation according to an embodiment of this disclosure. The schematic flowchart shown in FIG. 6 may correspond to a step of fitting initialization in the embodiment corresponding to FIG. 5. In the step of fitting initialization, a table $T_1$, a table $T_2$, an initialized straight line fitting matrix, and an initialized straight line equation storage matrix may be generated. Because the table $T_1$, the table $T_2$, the initialized straight line fitting matrix, and the initialized straight line equation storage matrix do not change with a placement position of a two-dimensional code green screen (that is, a two-dimensional code panel), the step of fitting initialization only needs to be performed once when the placement position of the two-dimensional code green screen does not change.

As shown in FIG. 6, the terminal device may create the table $T_1$ and the table $T_2$ based on a three-dimensional spatial geometric relationship composed of the two-dimensional code panel (that is, a spatial object). The table $T_1$ may be used to store a relationship between a two-dimensional code identifier and a straight line identifier, and the table $T_2$ may be used to store a relationship between the straight line identifier and a vanishing point identifier. For example, a two-dimensional code having a two-dimensional code identifier of 1 may include four spatial line segments. Line segment identifiers of the four spatial line segments are respectively determined by a spatial virtual straight line to which each spatial line segment belongs. For example, straight line identifiers of the spatial virtual straight lines to which the four spatial line segments belong may be a straight line identifier $K_1$, a straight line identifier $K_2$, a straight line identifier $K_3$, and a straight line identifier $K_4$. In this way, the terminal device may store, in the table $T_1$, the two-dimensional code identifier 1 in association with the straight line identifier $K_1$, the straight line identifier $K_2$, the straight line identifier $K_3$, and the straight line identifier $K_4$. For another example, the terminal device may store, in the table $T_2$, the straight line identifier K and a vanishing point identifier B of a vanishing point mapped by the spatial virtual straight line having the straight line identifier of K.

As shown in FIG. 6, the terminal device may initialize straight line fitting data based on a maximum quantity of points on a straight line (that is, a maximum quantity of space corners), and generate the straight line fitting matrix. Each element in the straight line fitting matrix may store an initialized value. A row of the straight line fitting matrix is a maximum quantity of straight lines (that is, a maximum quantity of spatial virtual straight lines), and a column thereof is initialized key point coordinates on the spatial virtual straight line (for example, [−1, −1]).

As shown in FIG. 6, the terminal device may initialize vanishing point fitting data based on the maximum quantity of straight lines at the vanishing points (that is, the maximum quantity of spatial virtual straight lines) and generate a straight line equation storage matrix. Each element of the straight line equation storage matrix may store an initialized value. A row of the straight line equation storage matrix is the maximum quantity of straight lines, and a column thereof is an initialized straight line parameter (for example, −1) in a straight line equation of the spatial virtual straight line.

Step S104: Generate, based on the vanishing point identifier and the straight line equation, vanishing point coordinates of the vanishing point indicated by the vanishing point identifier, and determine an intrinsic component parameter of a camera component for a target image based on the vanishing point coordinates.

For ease of understanding, FIG. 5 is a schematic flowchart of determining an intrinsic component parameter according to an embodiment of this disclosure. As shown in FIG. 5, a method for determining an intrinsic camera parameter based on a target image provided in this embodiment of this disclosure may be divided into five steps: detecting a two-dimensional code, fitting initialization, fitting straight lines, fitting vanishing points, and calculating an intrinsic camera parameter. An example in which an identification code is the two-dimensional code is used for description.

As shown in FIG. 5, in the step of detecting the two-dimensional code, the terminal device may obtain a target image (that is, an input image) captured by using a camera component, and detect a two-dimensional code of the input image by using a two-dimensional code detection algorithm, to obtain a two-dimensional code identifier (that is, a unit code identifier) of the two-dimensional code in the input image and two-dimensional code corner coordinates (that is, corner coordinates of a space corner).

As shown in FIG. 5, in the step of fitting initialization, the terminal device may create a table $T_1$ and a table $T_2$ based on a three-dimensional spatial geometric relationship composed of the two-dimensional code panel (that is, a spatial object). The table $T_1$ may be used to store a relationship between a two-dimensional code identifier and a straight line identifier, and the table $T_2$ may be used to store a relationship between the straight line identifier and a vanishing point identifier. In addition, the terminal device may further initialize straight line fitting data based on a maximum quantity of points on a straight line (that is, a maximum quantity of space corners) to generate a straight line fitting matrix, and initialize vanishing point fitting data based on a maximum quantity of straight lines at vanishing points (that is, a maximum quantity of spatial virtual straight lines) to generate a straight line equation storage matrix. Each element in the straight line fitting matrix and the straight line equation storage matrix may store an initialized value.

As shown in FIG. 5, in the step of fitting the straight lines, the terminal device may establish a relationship between the two-dimensional code corner coordinates and the straight line identifier based on the two-dimensional code identifier, then use the two-dimensional code corner coordinates and the straight line identifier as the straight line fitting data, and fill the straight line fitting matrix with the straight line fitting data. Further, the terminal device may fit all visible straight lines (that is, the spatial virtual straight lines) based on the straight line fitting data in the straight line fitting matrix, to obtain all visible straight line equations (that is, straight line equations of the spatial virtual straight lines).

As shown in FIG. 5, in the step of fitting the vanishing point, the terminal device may use straight line parameters in all of the visible straight line equations as the vanishing point fitting data, and fill the straight line equation storage matrix with the vanishing point fitting data. Further, the terminal device may divide the vanishing point fitting data in the straight line equation storage matrix based on the vanishing point identifier, to obtain the vanishing point fitting data corresponding to each vanishing point identifier, and then obtain vanishing point coordinates of the vanishing point corresponding to each vanishing point identifier based on the vanishing point fitting data corresponding to each vanishing point identifier.

As shown in FIG. 5, in the step of calculating the intrinsic camera parameter, the terminal device may screen the vanishing point coordinates to obtain available vanishing point coordinates (that is, vanishing point coordinates corresponding to a space division straight line that satisfies a vanishing point qualification condition), and then obtain the intrinsic component parameter (that is, the intrinsic camera parameter) of the camera component based on a vanishing point calibration algorithm. The vanishing point calibration algorithm may be applicable to a case in which two or three vanishing point coordinates exist.

It may be understood that in this embodiment of this disclosure, a value obtained with the high-precision Zhang Zhengyou's calibration method may be used as a truth value, to obtain a relative error of the intrinsic component parameter generated in this embodiment of this disclosure. The results are shown in Table 1.

TABLE 1

| | Zhang Zhengyou's camera calibration method | Camera calibration method in this disclosure | Relative error |
|---|---|---|---|
| Optical center abscissa $u_x$ | 953.09216 | 937.23175 | 1.66% |
| Optical center ordinate $u_y$ | 542.18050 | 546.13177 | 0.73% |
| x-direction focal length $f_x$ | 761.28896 | 773.72 | 1.63% |
| y-direction focal length $f_y$ | 760.02085 | 773.72 | 1.80% |

As shown in Table 1, an optical center may include an optical center abscissa $u_x$ and an optical center ordinate $u_y$. A focal length may include a x-direction focal length $f_x$ and a y-direction focal length $f_y$. For the four parameters shown in Table 1, errors in this embodiment of this disclosure and the Zhang Zhengyou's calibration method are both within 2%. The x-direction focal length $f_x$ and the y-direction focal length $f_y$ in this embodiment of this disclosure are the same.

On a single-core central processing unit (CPU), an overall time consumed to obtain the spatial virtual straight line, calculate the vanishing point, and calculate the intrinsic component parameter in this disclosure is less than 0.25 milliseconds, which does not occupy hardware resources. When this disclosure is applied to virtual-real fusion, only a small quantity of machine resources are occupied, and another virtual-real fusion related algorithm is not stalled.

It may be learned that in this embodiment of this disclosure, a single target image obtained by the camera component shooting a spatial object may be obtained, parallel lines (that is, the spatial virtual straight lines) are detected in real time in the target image, vanishing point coordinates of the vanishing points mapped by the parallel lines may be calculated, and then the intrinsic component parameter of the camera component is generated based on the intrinsic component parameter calibration method of the vanishing point. In this way, the intrinsic component parameter of the camera component may be determined by using a single image without processing a plurality of images and without using a hardware device to calibrate the intrinsic component parameter, which may significantly reduce the costs of calibrating the intrinsic component parameter and improve efficiency of calibration.

Figure 7:
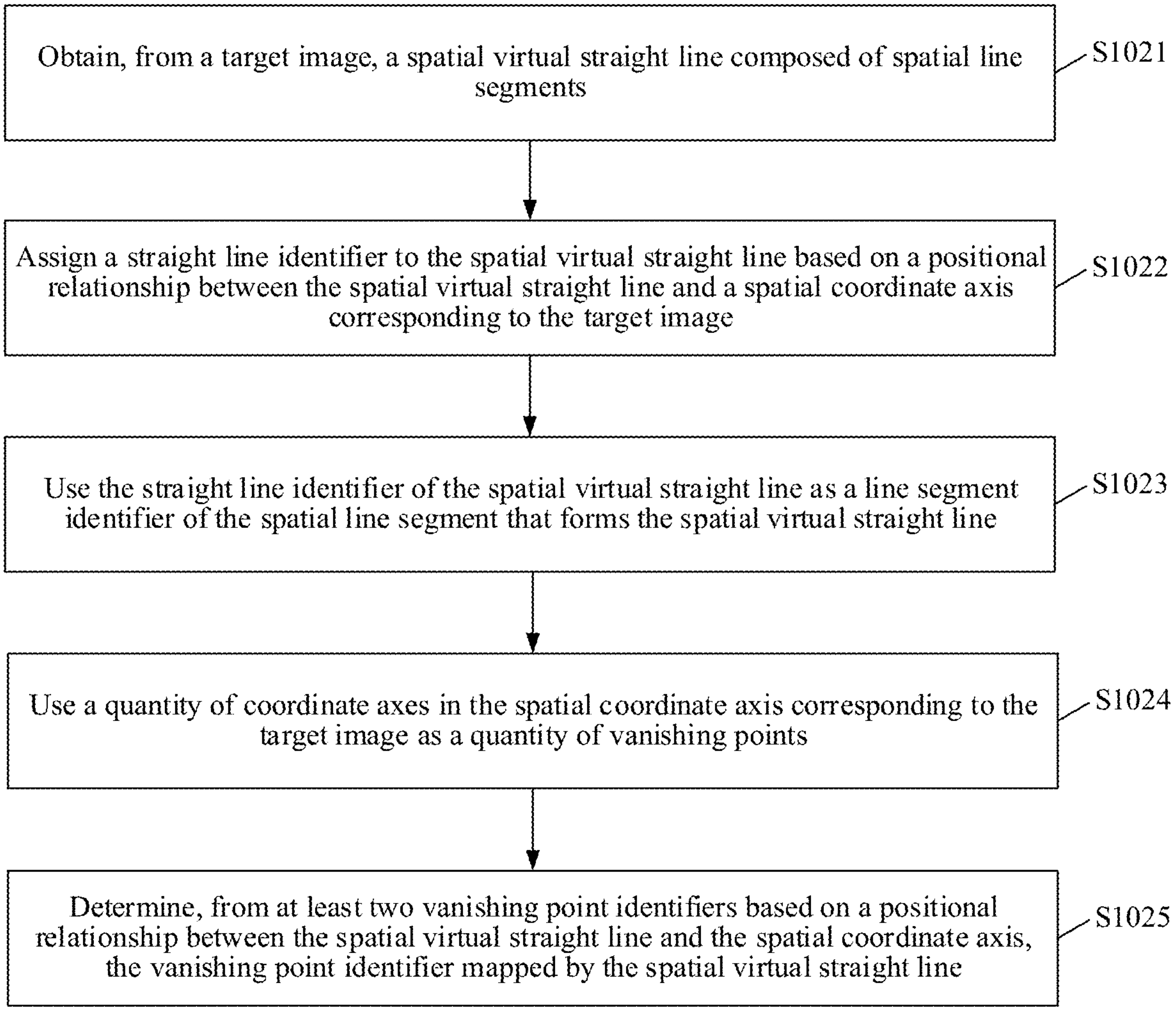
FIG. 7 is a schematic flowchart II of a data processing method according to an embodiment of this disclosure.

Further, FIG. 7 is a schematic flowchart II of a data processing method according to an embodiment of this disclosure. The data processing method may include the following step S1021 to step S1025. Step S1021 to step S1025 are specific embodiments of step S102 in the embodiment corresponding to FIG. 3.

Step S1021: Obtain, from the target image, the spatial virtual straight line composed of the spatial line segments.

The spatial virtual straight line composed of the spatial line segments is the spatial virtual straight line where the spatial line segments are located. For a specific process of obtaining the spatial virtual straight line composed of spatial line segments by the terminal device, reference may be made to the descriptions of step S102 in the embodiment corresponding to FIG. 3. Details are not described herein again.

Step S1022: Assign a straight line identifier to the spatial virtual straight line based on a positional relationship between the spatial virtual straight line and a spatial coordinate axis corresponding to the target image.

Specifically, the terminal device may obtain a target space plane formed by the spatial coordinate axis corresponding to the target image. The spatial coordinate axis forming the target space plane includes a first coordinate axis and a second coordinate axis, and the target space plane may be any one of a plane x, a plane y, and a plane z. Further, the terminal device may traverse an identification code in the target space plane to obtain the spatial virtual straight line associated with the identification code in the target space plane, and determine, as a target spatial virtual straight line, the spatial virtual straight line associated with the identification code in the target space plane. Further, the terminal device may assign a first straight line identifier to the target spatial virtual straight line parallel to the first coordinate axis, and assign a second straight line identifier to the target spatial virtual straight line parallel to the second coordinate axis. The first straight line identifier is sorted based on the second coordinate axis, and the second straight line identifier is sorted based on the first coordinate axis. The straight line identifier includes a first straight line identifier and a second straight line identifier.

It may be understood that for the identification codes on a left wall and a right wall, top, bottom, left, and right indicates that a person stands on the ground, and faces top, bottom, left, and right of the identification code. For the ground, top, bottom, left, and right indicates that a person stands on the right wall, and faces top, bottom, left, and right of the identification code. In some embodiments, for the ground, top, bottom, left, and right may alternatively indicate that a person stands on the left wall, and faces top, bottom, left, and right of the identification code.

For the spatial virtual straight line of the plane x (that is, the right wall), an index matrix $M_x$ having a height of c and a width of b is constructed based on the arrangement mode of the identification codes in the plane x, and an element in an $i^{th}$ row and a $j^{th}$ column of the matrix is a unit code identifier of the identification code in an $i^{th}$ row and a $j^{th}$ column on the right wall. In this way, the terminal device may assign the straight line identifier to four points included in each identification code while traversing the index matrix $M_x$ in a column-first manner (or in a row-first manner). The assignment manner is: first assigning subscripts of 0 to (c−1) to upper straight lines of all the identification codes in an order from the highest to the lowest; assigning subscripts of c to (2c−1) to lower straight lines of all the identification codes in an order from the highest to the lowest; assigning subscripts of 2c to (2c+b−1) to left straight lines of all the identification codes in an order from the leftmost to the rightmost; and then assigning subscripts of (2c+b) to (2c+2b−1) to right straight lines of all the identification codes in an order from the leftmost to the rightmost.

For the spatial virtual straight line of the plane y (that is, the left wall), an index matrix My having a height of c and a width of a is constructed based on the arrangement mode of the identification codes in the plane y, and an element in an $i^{th}$ row and a $j^{th}$ column of the matrix is a unit code identifier of the identification code in an $i^{th}$ row and a $j^{th}$ column on the left wall. In this way, the terminal device may assign the straight line identifier to four points included in each identification code while traversing the index matrix My in a column-first manner (or in a row-first manner). The assignment manner is: first assigning subscripts of (2c+2b) to (2c+2b+c−1) to upper straight lines of all the identification codes in an order from the highest to the lowest; assigning subscripts of 3c+2b to (4c+2b−1) to lower straight lines of all the identification codes in an order from the highest to the lowest; assigning subscripts of (4c+2b) to (4c+2b+a−1) to left straight lines of all the identification codes in an order from the leftmost to the rightmost; and then assigning subscripts of (4c+2b+a) to (4c+2b+2a−1) to right straight lines of all the identification codes in an order from the leftmost to the rightmost.

For the spatial virtual straight line of the plane z (that is, the ground), an index matrix $M_z$ having a height of a and a width of b is constructed based on the arrangement mode of the identification codes in the plane z, and an element in the $i^{th}$ row and the $j^{th}$ column of the matrix is a unit code identifier of the identification code in an $i^{th}$ row and a $j^{th}$ column on the ground. In this way, the terminal device may assign the straight line identifier to four points included in each identification code while traversing the index matrix $M_z$ in a column-first manner (or in a row-first manner). The assignment manner is: first assigning subscripts of (4c+2b+2a) to (4c+2b+3a−1) to upper straight lines of all the identification codes in an order from the highest to the lowest; assigning subscripts of (4c+2b+3a) to (4c+2b+4a−1) to lower straight lines of all the identification codes in an order from the highest to the lowest; assigning subscripts of (4c+2b+4a) to (4c+3b+4a−1) to left straight lines of all the identification codes in an order from the leftmost to the rightmost; and then assigning subscripts of (4c+3b+4a) to (4c+4b+4a−1) to right straight lines of all the identification codes in an order from the leftmost to the rightmost.

It may be understood that the manner of assigning the straight line identifier to the spatial virtual straight line is not limited in the embodiments of this disclosure. For step S1025, reference may be made to the straight line identifier assigned in step S1022 to assign different vanishing point identifiers to the spatial virtual straight line. In some embodiments, for example, the plane x is used as an example for description. The terminal device may first assign subscripts of 0 to (2c−1) to the upper straight lines and the lower straight lines of all the identification codes in an order from the highest to the lowest, and then then assign subscripts of 2c to (2c+2b−1) to the left straight lines and the right straight lines of all the identification codes in an order from the leftmost to the rightmost.

Step S1023: Use the straight line identifiers of the spatial virtual straight line as a line segment identifier of the spatial line segment that forms the spatial virtual straight line.

For example, the spatial virtual straight line $S_2$ is composed of a spatial line segment $X_1$ and a spatial line segment $X_2$. If the straight line identifier of the spatial virtual straight line $S_2$ is a straight line identifier K, the terminal device may use the straight line identifier K as the line segment identifier of the spatial line segment $X_1$ and the spatial line segment $X_2$.

Figure 8:
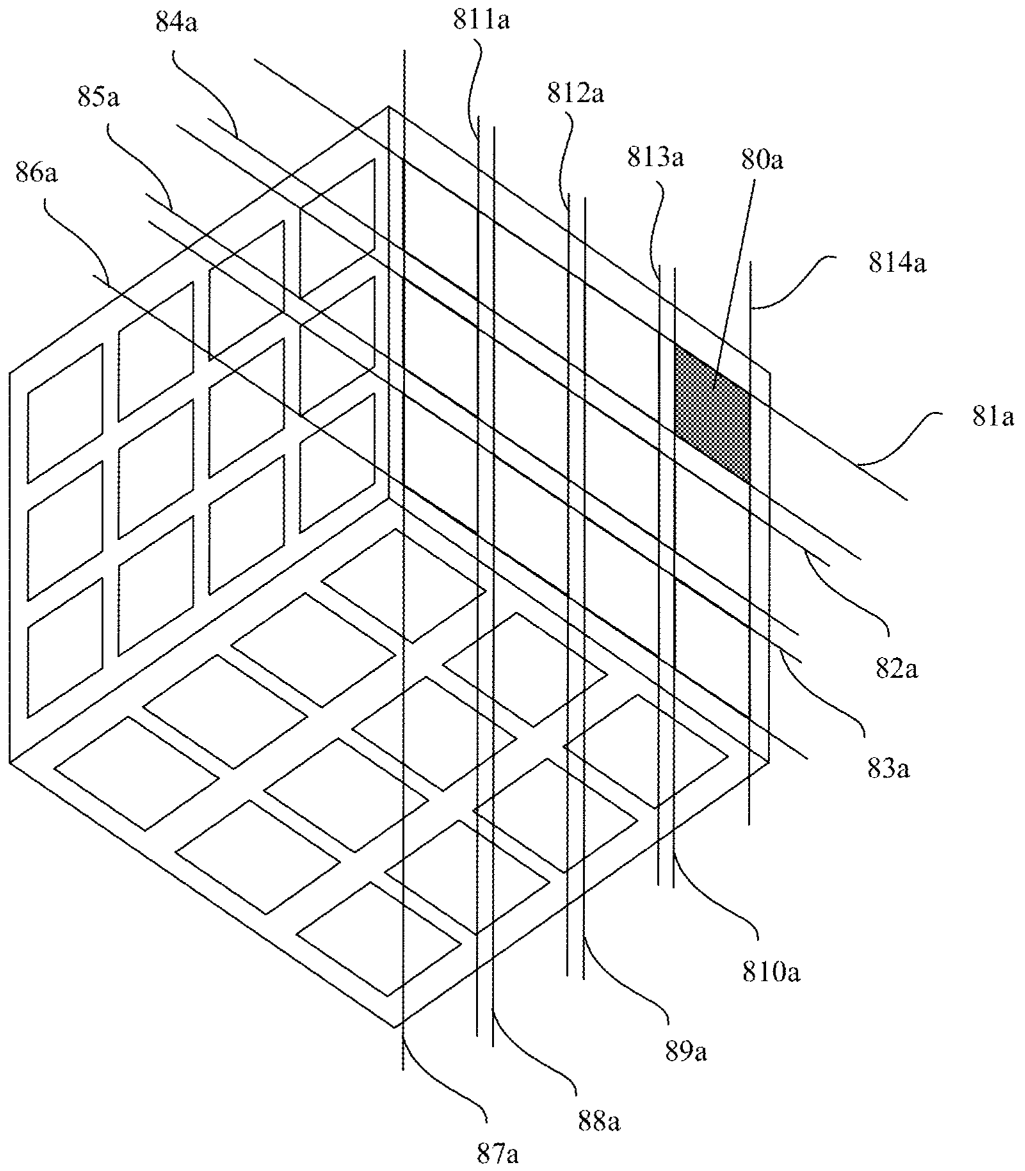
FIG. 8 is a schematic diagram of a scene for assigning a straight line identifier according to an embodiment of this disclosure.

For ease of understanding, FIG. 8 is a schematic diagram of a scene for assigning a straight line identifier according to an embodiment of this disclosure. A spatial object shown in FIG. 8 may correspond to three planes, and the three planes may specifically include a plane z, a plane y, and a plane x. The spatial object shown in FIG. 8 may correspond to three coordinate axes, and the three coordinate axes may specifically include an x-axis, a y-axis, and a z-axis. The plane z is perpendicular to the z-axis, the plane y is perpendicular to the y-axis, and the plane x is perpendicular to the x-axis.

As shown in FIG. 8, the plane x corresponding to the spatial object may include one or more identification codes. An example in which the one or more identification codes are 12 identification codes (that is, c times b (that is, 3 times 4) identification codes, c represents a quantity of identification codes of the plane x in a z-axis direction, and b represents a quantity of identification codes of the plane x in a y-axis direction) is used for description. 14 spatial virtual straight lines may be formed by the identification codes in the plane x. 3 identification codes may exist in a vertical direction of the plane x, and therefore 6 spatial virtual straight lines may be formed in the vertical direction. 4 identification codes may exist in a horizontal direction of the plane x, and therefore 8 spatial virtual straight lines may be formed in the horizontal direction.

As shown in FIG. 8, the 6 spatial virtual straight lines in the vertical direction may specifically include a straight line 81*a*, a straight line 82*a*, a straight line 83*a*, a straight line 84*a*, a straight line 85*a*, and a straight line 86*a*. The 8 spatial virtual straight lines in the horizontal direction may specifically include a straight line 87*a*, a straight line 88*a*, a straight line 89*a*, a straight line 810*a*, a straight line 811*a*, a straight line 812*a*, a straight line 813*a*, and a straight line 814*a*. The terminal device may assign the straight line identifiers to 14 spatial virtual straight lines of the plane x based on the description of step S1022. For example, the straight line identifier assigned to the straight line 81*a* is 1, the straight line identifier assigned to the straight line 82*a* is 2, the straight line identifier assigned to the straight line 83*a* is 3, the straight line identifier assigned to the straight line 84*a* is 4, the straight line identifier assigned to the straight line 85*a* is 5, . . . , the straight line identifier assigned to the straight line 813*a* is 13, and the straight line identifier assigned to the straight line 814*a* is 14.

As shown in FIG. 8, the 12 identification codes of the plane x may include an identification code 80*a*. The upper straight line of the identification code 80*a* is used to form the straight line 81*a*, the lower straight line is used to form the straight line 84*a*, the left straight line is used to form the straight line 810*a*, and the right straight line is used to form the straight line 814*a*. Therefore, a line segment identifier of the upper straight line of the identification code 80*a* is 1, the line segment identifier of the lower straight line is 4, the straight line identifier of the left straight line is 10, and the straight line identifier of the right straight line is 14.

Step S1024: Use a quantity of coordinate axes in a spatial coordinate axis corresponding to a target image as a quantity of vanishing points.

The quantity of vanishing points is at least two. As shown in FIG. 8, the quantity of coordinate axes corresponding to the spatial object is three, that is, the quantity of coordinate axes in the spatial coordinate axis corresponding to the target image is three. Therefore, the quantity of vanishing points is three. In some embodiments, in a case that the quantity of coordinate axes in the spatial coordinate axis corresponding to the target image is two, the quantity of vanishing points is two.

In some embodiments, in a case that the quantity of coordinate axes in the spatial coordinate axis corresponding to the target image is three, if no identification code does not exist in any two of the plane x, the plane y, or the plane z, the quantity of vanishing points is two.

Step S1025: Determine, from at least two vanishing point identifiers based on a positional relationship between the spatial virtual straight line and the spatial coordinate axis, a vanishing point identifier mapped by the spatial virtual straight line.

A vanishing point identifier corresponds to a vanishing point. The positional relationship between the spatial virtual straight line and the spatial coordinate axis is determined by step S1022.

For the spatial virtual straight line in the plane x, the terminal device may assign the spatial virtual straight line having the straight line identifiers of 0 to (c−1) to a y-axis vanishing point 1, that is, a vanishing point $l_y$; assign the spatial virtual straight line having the straight line identifiers of c to (2c−1) to the y-axis vanishing point 1, that is, the vanishing point $l_y$; assign the spatial virtual straight line having the straight line identifiers of 2c to (2c+b−1) to a z-axis vanishing point 2, that is, a vanishing point $l_z$; and assign the spatial virtual straight line having the straight line identifiers of (2c+b) to (2c+2b−1) to the z-axis vanishing point 2, that is, the vanishing point $l_z$.

For the spatial virtual straight line in the plane y, the terminal device may assign the spatial virtual straight line having the straight line identifiers of (2c+2b) to (2c+2b+c−1) to an x-axis vanishing point 0, that is, a vanishing point $l_x$; assign the spatial virtual straight line having the straight line identifiers of (3c+2b) to (4c+2b−1) to the x-axis vanishing point 0, that is, the vanishing point $l_x$; assign the spatial virtual straight line having the straight line identifiers of (4c+2b) to (4c+2b+a−1) to the z-axis vanishing point 2, that is, the vanishing point $l_z$; and assign the spatial virtual straight line having the straight line identifiers of (4c+2b+a) to (4c+2b+2a−1) to the z-axis vanishing point 2, that is, the vanishing point $l_z$.

For the spatial virtual straight line in the plane z, the terminal device may assign the spatial virtual straight line having the straight line identifiers of (4c+2b+2a) to (4c+2b+3a−1) the y-axis vanishing point 1, that is, the vanishing point $l_y$; assign the spatial virtual straight line having the straight line identifiers of (4c+2b+3a) to (4c+2b+4a−1) to the y-axis vanishing point 1, that is, the vanishing point $l_y$; assign the spatial virtual straight line having the straight line identifiers of (4c+2b+4a) to (4c+3b+4a−1) to the x-axis vanishing point 0, that is, the vanishing point $l_x$; and assign the spatial virtual straight line having the straight line identifiers of (4c+3b+4a) to (4c+4b+4a−1) to the x-axis vanishing point 0, that is, the vanishing point $l_x$.

Figure 9:
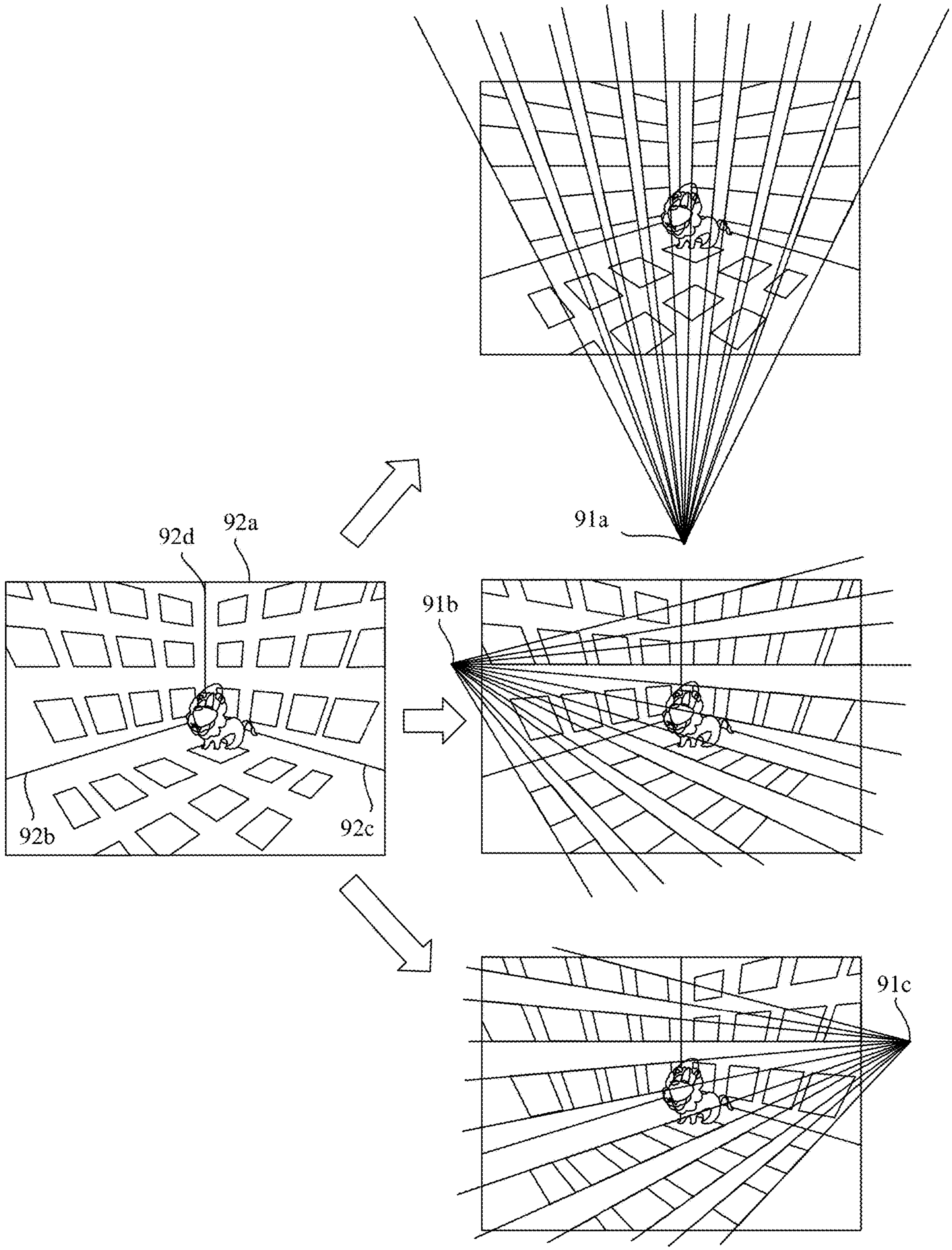
FIG. 9 is a schematic diagram of a scene for determining a vanishing point identifier according to an embodiment of this disclosure.

For a specific process of determining the vanishing point identifier mapped by the spatial virtual straight line in the plane x, the plane y, and the plane z, reference may be made to FIG. 9. FIG. 9 is a schematic diagram of a scene for determining an identifier of a vanishing point according to an embodiment of this disclosure. A target image 92*a* shown in FIG. 9 may correspond to three coordinate axes. The three coordinate axes may be a coordinate axis 92*b*, a coordinate axis 92*c*, and a coordinate axis 92*d*. The coordinate axis 92*b* may also be referred to as an x-axis, the coordinate axis 92*c* may also be referred to as a y-axis, and the coordinate axis 92*d* may also be referred to as a z-axis.

It may be understood that the terminal device may map spatial virtual straight lines parallel to the same coordinate axis to the same vanishing point identifier. As shown in FIG. 9, the vanishing point identifier mapped by the spatial virtual straight line parallel to the coordinate axis 92*b* is a vanishing point identifier 91*c*, the vanishing point identifier mapped by the spatial virtual straight line parallel to the coordinate axis 92*c* is a vanishing point identifier 91*b*, and the vanishing point identifier mapped by the spatial virtual straight line parallel to the coordinate axis 92*d* is a vanishing point identifier 91*a*. A straight line quantity of spatial virtual straight lines parallel to the coordinate axis 92*b* is 12, the straight line quantity of spatial virtual straight lines parallel to the coordinate axis 92*c* is 14, and the straight line quantity of spatial virtual straight lines parallel to the coordinate axis 92*d* is 16.

It may be learned that in this embodiment of this disclosure, the spatial virtual straight line composed of the spatial line segment may be obtained from the target image, the straight line identifier is assigned to the spatial virtual straight line based on a positional relationship between the spatial virtual straight line and the spatial coordinate axis, and then the straight line identifier of the spatial virtual straight line is used as the line segment identifier of the spatial line segment that constitutes the spatial virtual straight line. It may be understood that the vanishing point identifier mapped by the spatial virtual straight line may be determined from at least two vanishing point identifiers based on the positional relationship between the spatial virtual straight line and the spatial coordinate axis. The line segment identifier may be stored in the first table, the vanishing point identifier may be stored in the second table, and a speed of calibrating an intrinsic component parameter in subsequent steps may be increased by using the first table and the second table.

Figure 10:
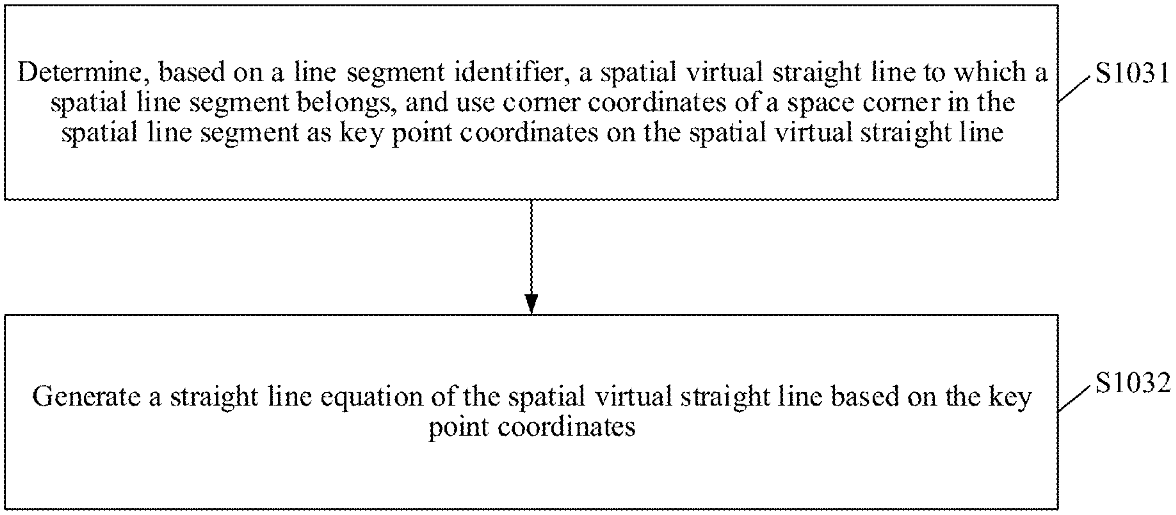
FIG. 10 is a schematic flowchart III of a data processing method according to an embodiment of this disclosure.

Further, FIG. 10 is a schematic flowchart III of a data processing method according to an embodiment of this disclosure. The data processing method may include the following step S1031 to step S1032. Step S1031 to step S1032 are specific embodiments of step S103 in the embodiment corresponding to FIG. 3.

Step S1031: Determine, based on the line segment identifier, the spatial virtual straight line to which the spatial line segment belongs, and use the corner coordinates of the space corner in the spatial line segment as key point coordinates on the spatial virtual straight line.

Specifically, the terminal device may obtain, from the first table based on the unit code identifier of the identification code, the line segment identifier of the spatial line segment forming the identification code. The spatial virtual straight line includes a spatial virtual straight line $S_i$, where i may be a positive integer, and i is less than or equal to a straight line quantity of spatial virtual straight lines. Further, if the line segment identifier obtained from the first table is a straight line identifier of the spatial virtual straight line $S_i$, the terminal device may use the spatial virtual straight line $S_i$ as the spatial virtual straight line to which the spatial line segment belongs. Further, the terminal device may obtain corner coordinates of a space corner in the spatial line segment. The space corner includes a first corner and a second corner, and the first corner and the second corner are two endpoints of the spatial line segment. Further, the terminal device may use the corner coordinates of the first corner and the corner coordinates of the second corner as key point coordinates on the spatial virtual straight line $S_i$ to which the spatial line segment belongs.

It may be understood that the terminal device may fill data (that is, a straight line fitting matrix $D_{line}$) for fitting the straight lines based on the key point coordinates. The terminal device may initialize actual quantities of points (that is, the quantity of key point coordinates on the spatial virtual straight line) of all spatial virtual straight lines to 0. The actual quantity of points of a $j^{th}$ spatial virtual straight line is denoted as $N_j$ (that is, an initial value of $N_j$ is 0), and then the detected identification codes are processed in sequence as follows. The unit code identifier (a serial number) of a current identification code is i, and a table $T_1$ is queried for line segment identifiers corresponding to four edges of the identification code having the unit code identifier of i. For the four edges of the identification code, that is, an upper edge, a lower edge, a left edge, and a right edge, the following processing is performed in sequence. The straight line identifier of the spatial virtual straight line where the current edge is located is recorded is j. The actual quantity of points $N_j$ of the spatial virtual straight line j is extracted. Two-dimensional coordinates of an endpoint 1 of the edge are extracted, and a $j^{th}$ row and an $N_j^{th}$ column of the straight line fitting matrix $D_{line}$ are filled with the two-dimensional coordinates. $N_j$ is increased by 1. To be specific, the quantity of key point coordinates on the spatial virtual straight line having the straight line identifier of j is increased by 1. Two-dimensional coordinates of an endpoint 2 of the edge are extracted, and a $j^{th}$ row and an $N_j^{th}$ column of the straight line fitting matrix $D_{line}$ are filled with the two-dimensional coordinates. $N_j$ is increased by 1.

The endpoint 1 is a first endpoint, and the endpoint 2 is a second endpoint. For a vertical spatial virtual straight line, the first endpoint may be located above the second endpoint. For a horizontal spatial virtual straight line, the first endpoint may be located to the left of the second endpoint. In some embodiments, for the vertical spatial virtual straight line, the first endpoint may be located below the second endpoint. For the horizontal spatial virtual straight line, the first endpoint may be located to the right of the second endpoint.

Step S1032: Generate a straight line equation of the spatial virtual straight line based on the key point coordinates.

Specifically, the terminal device may obtain the key point coordinates on the spatial virtual straight line $S_i$ from the straight line fitting matrix, average key point parameters in the key point coordinates on the spatial virtual straight line $S_i$ to obtain an average key point parameter corresponding to the spatial virtual straight line $S_i$, and generate a parameter matrix corresponding to the spatial virtual straight line $S_i$ based on the average key point parameter corresponding to the spatial virtual straight line $S_i$ and the key point parameter corresponding to the spatial virtual straight line $S_i$. Further, the terminal device may perform singular value decomposition (SVD) on the parameter matrix corresponding to the spatial virtual straight line $S_i$ to obtain a dominant eigenvector matrix corresponding to the spatial virtual straight line $S_i$. Further, the terminal device may obtain a parametric equation corresponding to the spatial virtual straight line $S_i$, determine the straight line parameter in the parametric equation corresponding to the spatial virtual straight line $S_i$ based on the matrix parameter in the dominant eigenvector matrix corresponding to the spatial virtual straight line $S_i$, and use, as the straight line equation of the spatial virtual straight line $S_i$, the parametric equation that determines the straight line parameter.

It may be understood that if the quantity of key point coordinates on the spatial virtual straight line is not 0, the terminal device may extract all of the key point coordinates of the spatial virtual straight line on the straight line fitting matrix $D_{line}$, and fit straight line equation parameters of the spatial virtual straight line (that is, the straight line parameter) by using the obtained key point coordinates. A current straight line label is denoted as i. A parametric equation of a straight line labeled as i is denoted as $a_ix+b_iy+c_i=0$. Elements in an $i^{th}$ row and a $j^{th}$ column of the straight line fitting matrix $D_{line}$ are denoted as two-dimensional coordinates $$[d_{i,j}^x, d_{i,j}^y].$$

A matrix $M_j$ (that is, the parameter matrix) is constructed, a height of the matrix $M_j$ is $N_i$ (that is, a quantity of key point coordinates on the spatial virtual straight line numbered i), and a width is 2. For a specific form of the matrix $M_j$, reference may be made to Formula (1):

$$M_j = \begin{bmatrix} d^x_{i,0} - \bar{x}_i & d^y_{i,0} - \bar{y}_i \\ d^x_{i,1} - \bar{x}_i & d^y_{i,0} - \bar{y}_i \\ \vdots & \vdots \\ d^x_{i,N_i-2} - \bar{x}_i & d^y_{i,N_i-2} - \bar{y}_i \\ d^x_{i,N_i-1} - \bar{x}_i & d^y_{i,N_i-1} - \bar{y}_i \end{bmatrix} \quad (1)$$

where $\bar{x}_2$ represents a first average key point parameter (that is, an average key point parameter in an x-axis direction), $\bar{y}_i$ represents a second average key point parameter (that is, an average key point parameter in a y-axis direction), $\bar{x}_i$ represents averaging of x-coordinates (that is, first key point parameters) of all key point coordinates on the spatial virtual straight line, and $\bar{y}_i$ represents averaging of y-coordinates (that is, second key point parameters) of all key point coordinates on the spatial virtual straight line. $\bar{x}_i$ and $\bar{y}_i$ may be collectively referred to as the average key point parameter corresponding to the spatial virtual straight line, and the first key point parameter and the second key point parameter may be collectively referred to as the key point parameter in the key point coordinates. For specific forms of $\bar{x}_i$ and $\bar{y}_i$, reference may be made to Formula (2) and Formula (3):

$$\bar{x}_i = \frac{\sum_{j=0}^{N_i-1} d^x_{i,j}}{N_i} \quad (2)$$

$$\bar{y}_i = \frac{\sum_{j=0}^{N_i-1} d^y_{i,j}}{N_i} \quad (3)$$

where $N_i$ may represent the quantity of key point coordinates on the spatial virtual straight line. The SVD is performed on the matrix $M_j$, so that the matrix may decomposed into $M_j = U\Sigma V^T$. It is to be understood that a specific process of the SVD is not limited in the embodiments of this disclosure. For example, SVD of opencv may be used in the embodiments of this disclosure. V obtained by performing the SVD on the matrix $M_j$ is the dominant eigenvector matrix. The dominant eigenvector matrix is an orthogonal matrix. A parameter $a_i$, a parameter $b_i$, and a parameter $c_i$ of the straight line equation may be calculated based on the dominant eigenvector matrix. For specific forms of the parameter $a_i$, the parameter $b_i$, and the parameter $c_i$, reference may be made to Formula (4), Formula (5), and Formula (6):

$$a_i = V_{1,0} \quad (4)$$

$$b_i = V_{1,1} \quad (5)$$

$$c_i = -(a_i\bar{x}_i + b_i\bar{y}_i) \quad (6)$$

where the parameter $b_i$ may be an element in a 1st row and a $0^{th}$ column of the dominant eigenvector matrix V. The parameter $b_i$ may be an element in a $1^{st}$ row and a $1^{st}$ column of the dominant eigenvector matrix V. A size of the dominant eigenvector matrix V is 2*2. The parameter $a_i$ and the parameter $b_i$ may be collectively referred to as matrix parameters in the dominant eigenvector matrix. The parameter $a_i$, the parameter $b_i$, and the parameter $c_i$ may be collectively referred to as the straight line parameters of the spatial virtual straight line. In this way, the terminal device may configure the parameter $a_i$ to an $i^{th}$ row and a $0^{th}$ column of a straight line equation storage matrix $D_{point}$, configure the parameter $b_i$ to an $i^{th}$ row and a $1^{st}$ column of the straight line equation storage matrix $D_{point}$, and configure the parameter $c_i$ to an $i^{th}$ row and a $2^{nd}$ column of the straight line equation storage matrix $D_{point}$. To be specific, the parameter $a_i$, the parameter $b_i$, and the parameter $c_i$ are used as the straight line parameters in the parametric equation. It is to be understood that the method for solving the parametric equation in the embodiments of this disclosure is not limited to the SVD, and other methods may also be used.

Figure 11:
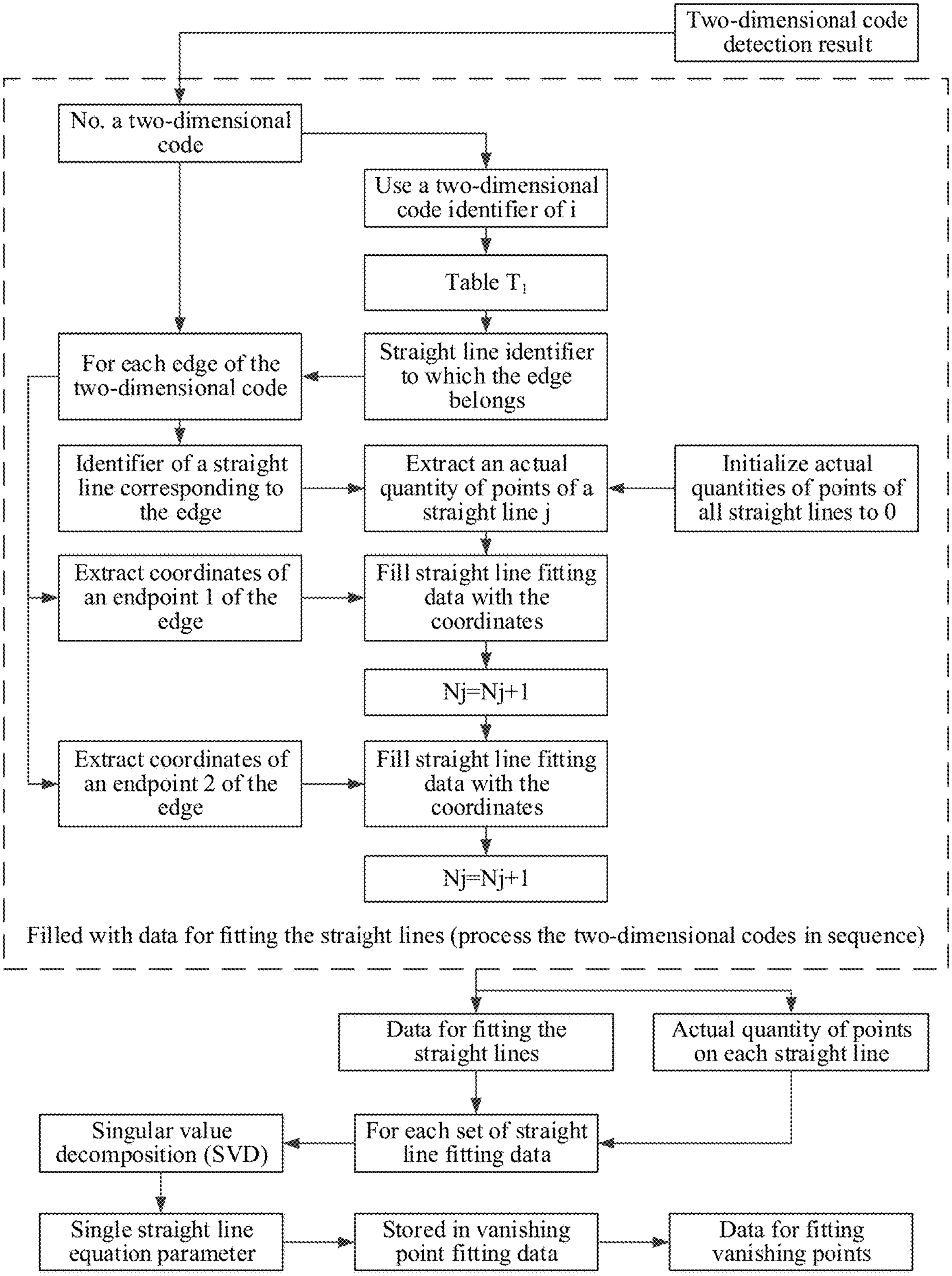
FIG. 11 is a schematic flowchart of determining a straight line equation according to an embodiment of this disclosure.

For ease of understanding, FIG. 11 is a schematic flowchart of determining a straight line equation according to an embodiment of this disclosure. As shown in FIG. 11, the terminal device may obtain a two-dimensional code detection result for a target image, and the two-dimensional code detection result may include a two-dimensional code identifier and two-dimensional code corner coordinates. Further, the terminal device may traverse detected two-dimensional codes, that is, obtain No. a two-dimensional code, then obtain a two-dimensional code identifier i of the No. a two-dimensional code, and obtain, from a table $T_1$, a straight line identifier (that is, a line segment identifier of a spatial line segment) to which an edge having the two-dimensional code identifier of i belongs.

As shown in FIG. 11, for each edge of the two-dimensional code having the two-dimensional code identifier of i, the terminal device may extract an actual quantity of points of the spatial virtual straight line j to which the edge belongs. The actual quantity of points may represent a quantity of key points (that is, a quantity of key point coordinates) on the spatial virtual straight line. The actual quantity of points of each spatial virtual straight line may be initialized to 0. Further, the terminal device may extract coordinates of two endpoints of one edge of the two-dimensional code having the two-dimensional code identifier of i, and fill straight line fitting data (that is, a straight line fitting matrix) with the coordinates of the two endpoints. To be specific, the terminal device may extract coordinates of the endpoint 1 of the edge and fill the straight line fitting data with the coordinates of the endpoint 1, and then extract coordinates of the endpoint 2 of the edge and fill the straight line fitting data with the coordinates of the endpoint 2. Different straight line fitting data is filled with the coordinates of the endpoint 1 and the coordinates of the endpoint 2. To be specific, the coordinates of the endpoint 1 and the coordinates of the endpoint 2 are used as the key point coordinates corresponding to different spatial virtual straight lines, and the terminal device needs to autonomously increase the actual quantity of points.

As shown in FIG. 11, after processing the two-dimensional codes in sequence and obtaining the fitting straight line data, the terminal device may generate a parameter matrix corresponding to each spatial virtual straight line based on the actual quantity of points of each straight line and the key point coordinates corresponding to each spatial virtual straight line (that is, each set of straight line fitting data), perform the SVD on the parameter matrix to obtain a single straight line equation parameter (that is, the straight line parameter corresponding to each spatial virtual straight line), and then store the straight line parameter in vanishing point fitting data (that is, the straight line fitting matrix). The straight line parameter is used for fitting data of a vanishing point.

It may be seen that in this embodiment of this disclosure, the spatial virtual straight line to which the spatial line segment belongs may be determined based on the line segment identifier, corner coordinates of a space corner in the spatial line segment are used as the key point coordinates on the spatial virtual straight line, and then the straight line equation of the spatial virtual straight line is generated based on the key point coordinates on the virtual straight line. The key point coordinates may be stored in the straight line fitting matrix. The straight line parameter of the straight line equation may be stored in a straight line equation storage matrix. The straight line fitting matrix and the straight line equation storage matrix may increase a speed of calibrating an intrinsic component parameter in subsequent steps.

Figure 12:
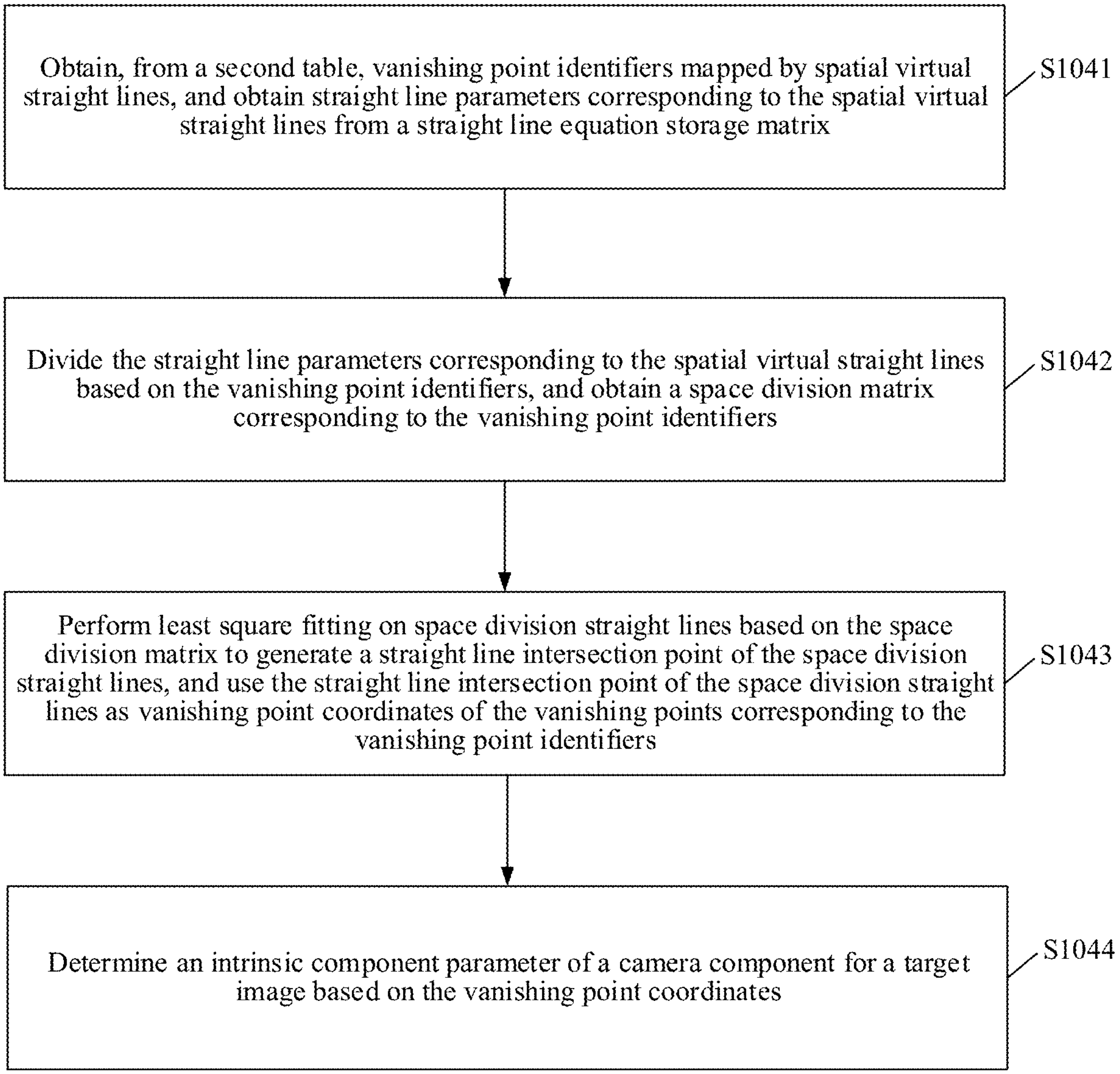
FIG. 12 is a schematic flowchart IV of a data processing method according to an embodiment of this disclosure.

Further, FIG. 12 is a schematic flowchart IV of a data processing method according to an embodiment of this disclosure. The data processing method may include the following step S1041 to step S1044. Step S1041 to step S1044 are specific embodiments of step S104 in the embodiment corresponding to FIG. 3.

Step S1041: Obtain, from a second table, vanishing point identifiers mapped by spatial virtual straight lines, and obtain straight line parameters corresponding to the spatial virtual straight lines from a straight line equation storage matrix.

Step S1042: Divide the straight line parameters corresponding to the spatial virtual straight lines based on the vanishing point identifiers, and obtain a space division matrix corresponding to the vanishing point identifiers.

Specifically, the terminal device may initialize a quantity of candidate straight lines of the vanishing point identifier, and initialize a first auxiliary matrix and a second auxiliary matrix based on a maximum quantity of key points. The straight line parameters corresponding to the spatial virtual straight lines include a first straight line parameter, a second straight line parameter, and a third straight line parameter. Further, the terminal device may traverse the spatial virtual straight lines, fill the first auxiliary matrix with the first straight line parameter and the second straight line parameter in the traversed spatial virtual straight lines based on the vanishing point identifiers, and fill the second auxiliary matrix with the third straight line parameter in the traversed spatial virtual straight lines based on the vanishing point identifiers. Positions of the first straight line parameter and the second straight line parameter in the first auxiliary matrix are determined by a quantity of candidate straight lines. A position of the third straight line parameter in the second auxiliary matrix is determined by the quantity of candidate straight lines. Further, the terminal device may accumulate the quantities of candidate straight lines, and obtain a quantity of target straight lines after traversing the spatial virtual straight lines. Further, the terminal device may use, as a new first auxiliary matrix, a straight line parameter obtained from the first auxiliary matrix having a quantity of rows being the quantity of target straight lines, use, as a new second auxiliary matrix, a straight line parameter obtained from the second auxiliary matrix having the quantity of rows being the quantity of target straight lines, and use the new first auxiliary matrix and the new second auxiliary matrix as the space division matrix corresponding to the vanishing point identifiers.

It may be understood that the terminal device may prepare to fill a matrix $D_x$, a matrix $D_y$, a matrix $D_z$, a vector $B_x$, a vector $B_y$, and a vector $B_z$ with the straight line equation storage matrix $D_{point}$, and prepare to fit the data of the vanishing point. A quantity $N_x$ of straight lines available for x-axis vanishing points (that is, the quantity of candidate straight lines corresponding to an x-axis) is initialized to zero, a quantity $N_y$ of straight lines available for y-axis vanishing points (that is, the quantity of candidate straight lines corresponding to a y-axis) is initialized to zero, and a quantity $N_z$ of straight lines available for z-axis vanishing points (that is, the quantity of candidate straight lines corresponding to a z-axis) is initialized to zero. The matrix $D_x$, the matrix $D_y$, and the matrix $D_z$ are initialized to a real matrix having N (that is, a possible maximum quantity of spatial virtual straight lines at each vanishing point) rows and 2 columns, and the vector $B_x$, the vector $B_y$, and the vector $B_z$ are N rows of vectors.

It may be understood that an initialized value of each element in the matrix $D_x$, the matrix $D_y$, the matrix $D_z$, the vector $B_x$, the vector $B_y$, and the vector $B_z$ is not limited in this embodiment of this disclosure. In this embodiment of this disclosure, each element in the matrix $D_x$, the matrix $D_y$, the matrix $D_z$, the vector $B_x$, the vector $B_y$, and the vector $B_z$ may be initialized to −1. The matrix $D_x$, the matrix $D_y$, the matrix $D_z$ may be collectively referred to as the first auxiliary matrix, and the vector $B_x$, the vector $B_y$, and the vector $B_z$ may be collectively referred to as the second auxiliary matrix. The matrix $D_x$ is the first auxiliary matrix corresponding to the x-axis, the matrix $D_y$ is the first auxiliary matrix corresponding to the y-axis, and the matrix $D_z$ is the first auxiliary matrix corresponding to the z-axis. The vector $B_x$ is the second auxiliary matrix corresponding to the x-axis, the vector $B_y$ is the second auxiliary matrix corresponding to the y-axis, and the vector $B_z$ is the second auxiliary matrix corresponding to the z-axis. The second auxiliary matrix may also be referred to as a second auxiliary vector.

Further, the terminal device may traverse each spatial virtual straight line. A straight line identifier of a current spatial virtual straight line is denoted as i, and parameters of the straight line equation are a parameter $a_i$ (that is, the first straight line parameter), a parameter $b_i$ (that is, the second straight line parameter), and a parameter $c_i$ (that is, the third straight line parameter). Further, the terminal device may extract, from a table $T_2$ based on a straight line identifier i of the spatial virtual straight line, the vanishing point identifier to which the straight line identifier i belongs, and then fill the matrix $D_x$ and the vector $B_x$, or the matrix $D_y$ and the vector $B_y$, or the matrix $D_z$ and the vector $B_z$ with the parameter $a_i$, the parameter $b_i$, and the parameter $c_i$ based on a type of the vanishing point identifier. The specific method is as follows. If the vanishing point identifier is equal to 0, an $N_y^{th}$ row and a $0^{th}$ column of $D_x$ are filled with $a_i$, an $N_y^{th}$ row and a $1^{st}$ column of $D_x$ are filled with $b_i$, and an $N_x^{th}$ row of $B_x$ is filled with $-c_i$. Then $N_x=N_x+1$, where the vanishing point identifier 0 is the vanishing point identifier corresponding to the x-axis. If the vanishing point identifier is equal to 1, an $N_y^{th}$ row and a $0^{th}$ column of $D_y$ are filled with $a_i$, an $N_y^{th}$ row and a $1^{st}$ column of $D_y$ are filled with $b_i$, and an $N_x^{th}$ row of $B_y$ is filled with $-c_i$. Then $N_y=N_y+1$, where the vanishing point identifier 1 is the vanishing point identifier corresponding to the y-axis. If the vanishing point identifier is equal to 2, an $N_z^{th}$ row and a $0^{th}$ column of $D_z$ are filled with $a_i$, an $N_z^{th}$ row and a $1^{st}$ column of $D_z$ are filled with $b_i$, and an $N_z^{th}$ row of $B_z$ is filled with $-c_i$. Then $N_z=N_z+1$, where the vanishing point identifier 2 is the vanishing point identifier corresponding to the z-axis. In some embodiments, if the actual quantity $N_i$ of points of the straight line is equal to zero, no operation is performed, and a next straight line is directly processed.

It may be understood that after all of the spatial virtual straight lines are traversed, the quantity of candidate straight lines may be referred to as the quantity of target straight lines. The quantity of target straight lines may represent the quantity of spatial virtual straight lines corresponding to the vanishing points.

Step S1043: Perform least square fitting on space division straight lines based on the space division matrix to generate a straight line intersection point of the space division straight lines, and use the straight line intersection point of the space division straight lines as vanishing point coordinates of the vanishing points corresponding to the vanishing point identifiers.

The space division straight lines are the spatial virtual straight lines corresponding to the space division matrix. Different space division matrices correspond to different spatial virtual straight lines, and different space division matrices may be used to generate different vanishing point coordinates.

It may be understood that the terminal device may respectively perform the following operations on the matrix $D_x$, the vector $B_x$, the matrix $D_y$, the vector $B_y$, the matrix $D_z$, and the vector $B_z$, and calculate the vanishing points corresponding to the x-axis, the y-axis, and the z-axis. It may be understood that if the quantity $N_x$ of target straight lines is greater than or equal to 2, the x-axis vanishing point is calculated, otherwise it is considered that the x-axis vanishing point does not exist. Therefore, the terminal device may construct a matrix $P_x$ and a vector $Q_x$. The matrix $P_x$ is first $N_x$ rows of the matrix $D_x$, and the vector $Q_x$ is first $N_x$ rows of the vector $B_x$. The matrix $P_x$ may be referred to as the new first auxiliary matrix, the vector $Q_x$ may be referred to as the new second auxiliary matrix, and the matrix $P_x$ and the matrix $Q_x$ may be collectively referred to as the space division matrix corresponding to the x-axis. In this way, for the calculation method of vanishing point coordinates $l_x$ of the x-axis vanishing point generated by the terminal device based on the space division matrix corresponding to the x-axis, reference may be made to Formula (7):

$$l_x = (P_x^T \cdot P_x)^{-1} \cdot (P_x^T \cdot B_x) \tag{7}$$

It may be understood that if the quantity $N_y$ of target straight lines is greater than or equal to 2, the y-axis vanishing point is calculated, otherwise it is considered that the y-axis vanishing point does not exist. Therefore, the terminal device may construct a matrix $P_y$ and the vector $Q_y$. The matrix $P_y$ is first $N_y$ rows of the matrix $D_y$, and the vector $Q_y$ is first $N_y$ rows of the vector $B_y$. The matrix $P_y$ may be referred to as the new first auxiliary matrix, the vector $Q_y$ may be referred to as the new second auxiliary matrix, and the matrix $P_y$ and the matrix $Q_y$ may be collectively referred to as the space division matrix corresponding to the y-axis. In this way, for the calculation method of vanishing point coordinates $l_y$ of the y-axis vanishing point generated by the terminal device based on the space division matrix corresponding to the y-axis, reference may be made to Formula (8):

$$l_y = (P_y^T \cdot P_y)^{-1} \cdot (P_y^T \cdot B_y) \tag{8}$$

It may be understood that if the quantity $N_z$ of target straight lines is greater than or equal to 2, the z-axis vanishing point is calculated, otherwise it is considered that the z-axis vanishing point does not exist. Therefore, the terminal device may construct a matrix $P_z$ and the vector $Q_z$. The matrix $P_z$ is first $N_z$ rows of the matrix $D_z$, and the vector $Q_z$ is first $N_z$ rows of the vector $B_z$. The matrix $P_z$ may be referred to as the new first auxiliary matrix, the vector $Q_z$ may be referred to as the new second auxiliary matrix, and the matrix $P_z$ and the matrix $Q_z$ may be collectively referred to as the space division matrix corresponding to the z-axis. In this way, for the calculation method of vanishing point coordinates $l_z$ of the z-axis vanishing point generated by the terminal device based on the space division matrix corresponding to the z-axis, reference may be made to Formula (9):

$$l_z = (P_z^T \cdot P_z)^{-1} \cdot (P_z^T \cdot B_z) \tag{9}$$

Step S1044: Determine an intrinsic component parameter of a camera component for a target image based on the vanishing point coordinates.

Figure 14:
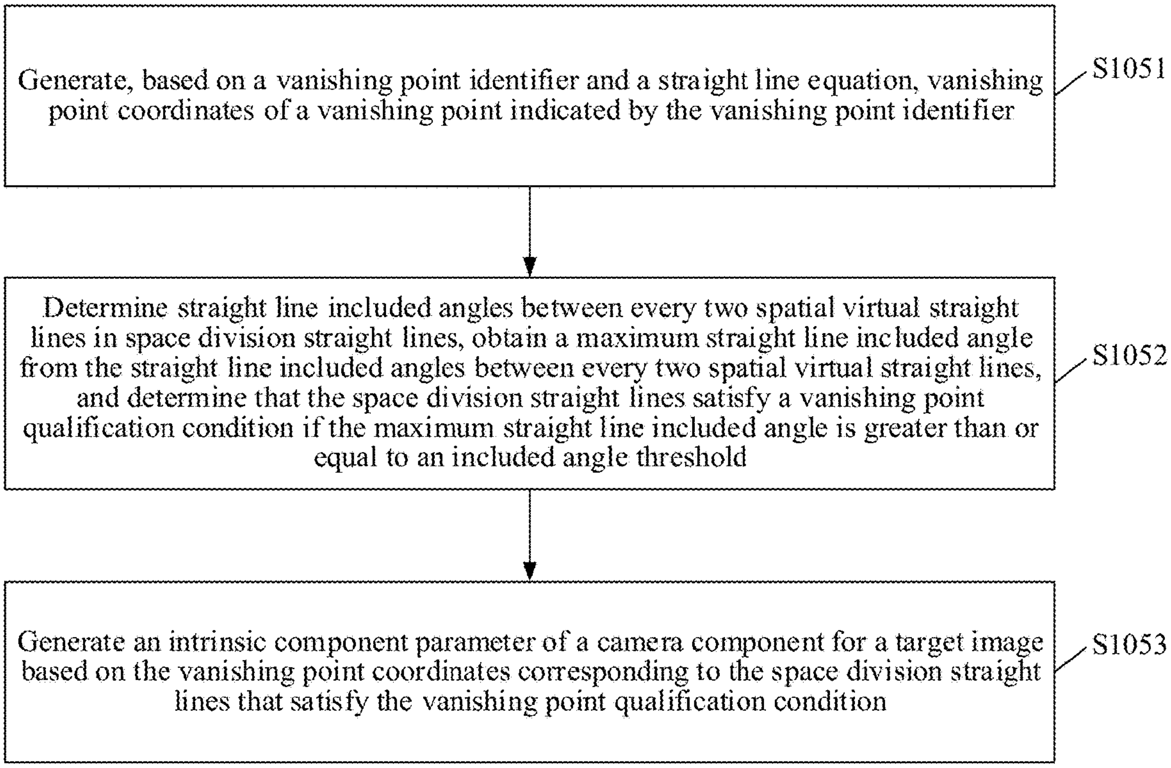
FIG. 14 is a schematic flowchart V of a data processing method according to an embodiment of this disclosure.

For a specific process of determining the intrinsic component parameter of the camera component for the target image by the terminal device based on the vanishing point coordinates, reference may be made to the description of step S1052 to step S1053 in the embodiment corresponding to FIG. 14.

Figure 13:
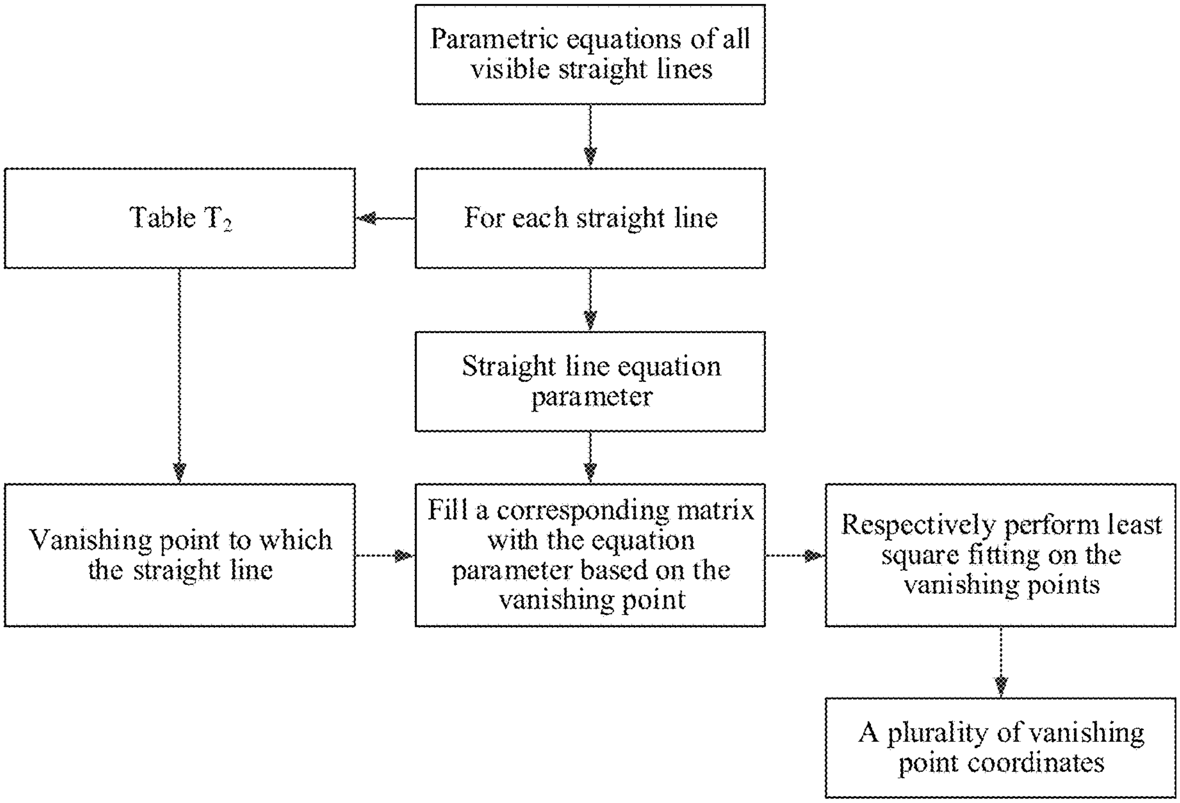
FIG. 13 is a schematic flowchart of determining coordinates of a vanishing point according to an embodiment of this disclosure.

For ease of understanding, FIG. 13 is a schematic flowchart of determining vanishing point coordinates according to an embodiment of this disclosure. As shown in FIG. 13, the terminal device may obtain parametric equations of all visible straight lines (that is, straight line equations of spatial virtual straight lines). For each visible straight line, straight line equation parameters (that is, straight line parameters) in the parametric equation are divided based on a vanishing point identifier (that is, a vanishing point to which each spatial virtual straight line belongs) mapped by each visible straight line recorded in a table $T_2$. To be specific, a corresponding matrix (that is, a space division matrix) is filled with the straight line equation parameters based on the vanishing point, and the space division matrix corresponding to each vanishing point is obtained.

Further, as shown in FIG. 13, the terminal device may respectively perform least square fitting on the vanishing points based on the space division matrix corresponding to each vanishing point, and obtain vanishing point coordinates of each vanishing point. A vanishing point corresponds to a coordinate axis, and the coordinate axis corresponds to a straight line equation of a group of spatial virtual straight lines (that are, space division straight lines).

It may be seen that in this embodiment of this disclosure, the vanishing point identifiers mapped by the spatial virtual straight lines may be obtained from a second table, the straight line parameters corresponding to the spatial virtual straight lines are obtained from a straight line equation storage matrix, and the straight line parameters corresponding to the spatial virtual straight lines are divided based on the vanishing point identifiers, to obtain a space division matrix corresponding to the vanishing point identifier. Further, least square fitting is performed on the space division straight lines based on the space division matrix, so as to generate the vanishing point coordinates of the vanishing points corresponding to the space division straight lines, and then an intrinsic component parameter of a camera component is determined based on the vanishing point coordinates. The manner of determining the intrinsic component parameter based on the vanishing point coordinates provided in this embodiment of this disclosure may reduce the costs of calibrating the intrinsic component parameter and increase a calibration speed.

Further, FIG. 14 is a schematic flowchart V of a data processing method according to an embodiment of this disclosure. The data processing method may include the following step S1051 to step S1053. Step S1051 to step S1053 are specific embodiments of step S104 in the embodiment corresponding to FIG. 3.

Step S1051: Generate, based on a vanishing point identifier and a straight line equation, vanishing point coordinates of a vanishing point indicated by the vanishing point identifier.

For a specific process of generating the vanishing point coordinates by a terminal device based on the vanishing point identifier and the straight line equation, reference may be made to the description of step S1041 to step S1043 in the embodiment corresponding to FIG. 12.

Step S1052: Determine angles between every two spatial virtual straight lines in space division straight lines, obtain a maximum angle from the angles between every two spatial virtual straight lines, and determine that the space division straight lines satisfy a vanishing point qualification condition if the maximum angle is greater than or equal to an included angle threshold.

It may be understood that the terminal device may automatically detect, based on the detected vanishing point, whether the vanishing point is available. For each group of space division straight lines, if the group of space division straight lines include only two spatial virtual straight lines, the terminal device may directly calculate an included angle $\alpha$ (that is, the maximum angle) between the two spatial virtual straight lines. In some embodiments, if the group of space division straight lines include more than two spatial virtual straight lines, the terminal device may calculate the included angles between every two spatial virtual straight lines, and use the maximum one of the included angles between every two spatial virtual straight lines as the included angle $\alpha$ (that is, the maximum angle).

In some embodiments, if the maximum angle is less than the included angle threshold, it is determined that the vanishing points corresponding to the group of space division straight lines are not available. To be specific, it is determined that the space division straight lines do not satisfy the vanishing point qualification condition. The vanishing point qualification condition is a condition that the maximum angle between every two spatial virtual straight lines in the space division straight lines is greater than or equal to the included angle threshold. In other words, if the spatial virtual straight lines in the space division straight lines are approximately parallel in the target image, it may be determined that the group of space division straight lines are not available, and the vanishing point coordinates determined by using unavailable space division straight lines are inaccurate. It is to be understood that a specific value of the included angle threshold is not limited in this embodiment of this disclosure.

Step S1053: Generate the intrinsic component parameter of the camera component for the target image based on the vanishing point coordinates corresponding to the space division straight lines that satisfy the vanishing point qualification condition.

It is to be understood that the terminal device may generate the intrinsic component parameter of the camera component for the target image when the space division straight lines that satisfy the vanishing point qualification condition are 2 groups or 3 groups. A group of space division straight lines correspond to a vanishing point, the spatial virtual straight lines in each group of space division straight lines are parallel to each other, and different groups of space division straight lines are perpendicular to each other.

When the space division straight lines satisfying the vanishing point qualification condition are less than or equal to 1 group, that is, when a quantity of available vanishing points is less than or equal to 1, the terminal device does not calibrate the intrinsic component parameter. When the space division straight lines satisfying the vanishing point qualification condition are equal to 2 groups, that is, when the quantity of available vanishing points is equal to 2, the terminal device may call a calibration algorithm of 2 vanishing points. When the space division straight lines satisfying the vanishing point qualification condition are equal to 3 groups, that is, when the quantity of available vanishing points is equal to 3, the terminal device may call the calibration algorithm of 3 vanishing points.

It is to be understood that when the space division straight lines satisfying the vanishing point qualification condition are equal to 2 groups (that is, when the quantity of vanishing points is 2), the vanishing point coordinates corresponding to the space division straight lines that satisfy the vanishing point qualification condition include first vanishing point coordinates and second vanishing point coordinates. It is to be understood that the terminal device may determine an optical center abscissa and an optical center ordinate of the camera component in the target image based on an image height and an image width of the target image. The optical center abscissa and the optical center ordinate are used to represent optical center coordinates of an (component) optical center of the camera component. Further, the terminal device may determine a first vector from the (component) optical center of the camera component to the first vanishing point coordinates and a second vector from the (component) optical center of the camera component to the second vanishing point coordinates. Further, the terminal device may determine a vertical relationship between the first vector and the second vector based on a vertical relationship between the space division straight line corresponding to the first vanishing point coordinates and the space division straight line corresponding to the second vanishing point coordinates, and establish, based on the vertical relationship between the first vector and the second vector, a constraint equation associated with the first vector and the second vector. Further, the terminal device may determine a component focal length of the camera component based on the first vanishing point coordinates, the second vanishing point coordinates, and the constraint equation. Further, the terminal device may use the optical center coordinates and the component focal length as the intrinsic component parameters of the camera component for the target image.

The terminal device may obtain optical center coordinates $(u_x, u_y)$. A width (that is, the image width) of the target image is w, and a height (that is, the image height) is h. Therefore, the optical center of the camera component is in the center of a picture formed by the target image. To be specific, $u_x=w/2$ (that is, the optical center abscissa), and $u_y=h/2$ (that is, the optical center ordinate).

The terminal device may calculate a focal length f of the camera component (that is, the component focal length). In a two-dimensional xy coordinate system of an image plane (that is, a plane where a focal point is perpendicular to an optical axis), a right-handed rectangular coordinate system is established by using a direction along the focal point toward the optical center as a z-axis. The vanishing point and the optical center are located on an imaging plane, and the imaging plane is located at an origin of the z-axis. In the coordinate system, coordinates of the focal point $c_f$ are ($u_x$, $u_y$, −f), coordinates of the optical center c are ($u_x$, $u_y$, 0), coordinates p of the vanishing point 1 are ($p_x$, $P_y$, −f) (that is, the first vanishing point coordinates), coordinates q of the vanishing point 2 are ($q_x$, $q_y$, −f) (that is, the second vanishing point coordinates), and a distance between the focal point $c_f$ and the optical center c is the focal length f. The vanishing point 1 and the vanishing point 2 may be vanishing points corresponding to any two coordinate axes in the x-axis, the y-axis, and the z-axis of the spatial coordinate axis corresponding to the target image. To be specific, the first vanishing point coordinates and the second vanishing point coordinates are any two vanishing point coordinates among the vanishing point coordinates $l_x$, the vanishing point coordinates $l_y$, and the vanishing point coordinates $l_z$. Lines connecting the optical center c to the vanishing point 1 and the vanishing point 2 coincide with coordinate axes in the right-handed rectangular coordinate system.

Because two groups of parallel lines in a three-dimensional space (that is, the space division straight line corresponding to the vanishing point 1 and the space division straight line corresponding to the vanishing point 2) are perpendicular to each other, a vector $\vec{v}_1$ from the optical center c to the vanishing point 1 (that is, the first vector, which is parallel to a group of parallel lines) is perpendicular to a vector $\vec{v}_2$ from the optical center c to the vanishing point 2 (that is, the second vector, which is parallel to another group of parallel lines), that is, $\vec{v}_1 \cdot \vec{v}_2 = 0$. For a constraint equation associated with the first vector and the second vector that is obtained by expansion, reference may be made to Formula (10):

$$(p_x - u_x)(q_x - u_x) + (p_y - u_y)(q_y - u_y) + f^2 = 0 \tag{10}$$

According to the constraint equation shown in Formula (10), Formula (11) of the focal length f may be determined:

$$f = \sqrt{-(p_x - u_x)(q_x - u_x) - (p_y - u_y)(q_y - u_y)} \tag{11}$$

In some embodiments, it is to be understood that when 3 groups of space division straight lines satisfy the vanishing point qualification condition (that is, when the quantity of vanishing points is 3), the vanishing point coordinates corresponding to the space division straight lines that satisfy the vanishing point qualification condition include first vanishing point coordinates, second vanishing point coordinates, and third vanishing point coordinates. It is to be understood that the terminal device may determine a first vector from the (component) optical center of the camera component to the first vanishing point coordinates, a second vector from the (component) optical center of the camera component to the second vanishing point coordinates, and a third vector from the (component) optical center of the camera component to the third vanishing point coordinates. Further, the terminal device may determine a vertical relationship among the first vector, the second vector, and the third vector based on a vertical relationship among the space division straight line corresponding to the first vanishing point coordinates, the space division straight line corresponding to the second vanishing point coordinates, and the space division straight line corresponding to the third vanishing point coordinates, establish a constraint equation associated with the first vector and the second vector based on the vertical relationship between the first vector and the second vector, establish a constraint equation associated with the first vector and the third vector based on the vertical relationship between the first vector and the third vector, and establish a constraint equation associated with the second vector and the third vector based on the vertical relationship between the second vector and the third vector. Further, the terminal device may determine the component focal length of the camera component and the optical center abscissa and the optical center ordinate of the camera component in the target image based on the first vanishing point coordinates, the second vanishing point coordinates, the third vanishing point coordinates, the constraint equation associated with the first vector and the second vector, the constraint equation associated with the first vector and the third vector, and the constraint equation associated with the second vector and the third vector. The optical center abscissa and the optical center ordinate are used to represent optical center coordinates of the (component) optical center of the camera component. Further, the terminal device may use the optical center coordinates and the component focal length as the intrinsic component parameters of the camera component for the target image.

The 3 vanishing points indicate that 3 groups of parallel lines perpendicular to each other exist in a spatial object. Therefore, a quantity of constraint equations formed by the vertical relationships is three. In this way, $u_x$, $u_y$, and f may be solved by using the three constraint equations, without considering by default that $u_x$=w/2 and $u_y$=h/2. Specifically, the processing process is as follows. In the two-dimensional xy coordinate system of the image plane, the right-handed rectangular coordinate system is established by using the direction along the focal point toward the optical center as the z-axis. In the coordinate system, coordinates of the focal point $c_f$ are ($u_x$, $u_y$, −f), coordinates of the optical center c are ($u_x$, $u_y$, 0), coordinates p of the vanishing point 1 are ($p_x$, $p_y$, 0) (that is, the first vanishing point coordinates), coordinates q of the vanishing point 2 are ($q_x$, $q_y$, 0) (that is, the second vanishing point coordinates), and coordinates r of the vanishing point 3 are ($r_x$, $r_y$, 0) (that is, the third vanishing point coordinates). The vanishing point 1, the vanishing point 2, and the vanishing point 3 may be vanishing points respectively corresponding to the x-axis, the y-axis, and the z-axis of the spatial coordinate axis corresponding to the target image. To be specific, the first vanishing point coordinates, the second vanishing point coordinates, and the third vanishing point coordinates are the vanishing point coordinates $l_x$, the vanishing point coordinates $l_y$, and the vanishing point coordinates 12. Lines connecting the optical center to the vanishing point 1, the vanishing point 2, and the vanishing point 3 coincide with the coordinate axes in the right-handed rectangular coordinate system.

Every two groups of parallel lines (that is, the space division straight line corresponding to the vanishing point 1 and the space division straight line corresponding to the vanishing point 2, the space division straight line corresponding to the vanishing point 1 and the space division straight line corresponding to the vanishing point 3, and the space division straight line corresponding to the vanishing point 2 and the space division straight line corresponding to the vanishing point 2) are perpendicular to each other in the three-dimensional space. Therefore, the vector $\vec{v}_1$ from the optical center c to the vanishing point 1 (the vector is parallel to a group of parallel lines) is perpendicular to the vector $\vec{v}_2$ from the optical center c to the vanishing point 2 (the vector is parallel to another group of parallel lines), the vector $\vec{v}_1$ from the optical center c to the vanishing point 1 is perpendicular to the vector $\vec{v}_3$ from the optical center c to the vanishing point 3, and the vector $\vec{v}_2$ from the optical center c to the vanishing point 2 is perpendicular to the vector $\vec{v}_3$ from the optical center c to the vanishing point 3. To be specific, $\vec{v}_1 \cdot \vec{v}_1=0$, $\vec{v}_1 \cdot \vec{v}_3=0$, and $\vec{v}_2 \cdot \vec{v}_3=0$. Based on the above, for the constraint equations obtained by expansion, reference may be made to Formula (12), Formula (13), and Formula (14):

$$(p_x - u_x)(q_x - u_x) + (p_y - u_y)(q_y - u_y) + f^2 \tag{12}$$

$$(p_x - u_x)(r_x - u_x) + (p_y - u_y)(r_y - u_y) + f^2 = 0 \tag{13}$$

$$(q_x - u_x)(r_x - u_x) + (q_y - u_y)(r_y - u_y) + f^2 \tag{14}$$

According to the constraint equations shown in Formula (12), Formula (13), and Formula (14), Formula (15) may be obtained after simplification:

$$\begin{bmatrix} q_x - p_x & q_y - p_y \\ r_x - q_x & r_y - q_y \end{bmatrix} \cdot \begin{bmatrix} u_x \\ u_y \end{bmatrix} = \begin{bmatrix} r_x * (q_x - p_x) + r_y * (q_y - p_y) \\ p_x * (r_x - q_x) + p_y * (r_y - q_y) \end{bmatrix} \tag{15}$$

After matrix transformation is performed on Formula (15), Formula (16) of $[u_x, u_y]^T$ may be obtained:

$$\begin{bmatrix} u_x \\ u_y \end{bmatrix} = \begin{bmatrix} q_x - p_x & q_y - p_y \\ r_x - q_x & r_y - q_y \end{bmatrix}^{-1} \cdot \begin{bmatrix} r_x * (q_x - p_x) + r_y * (q_y - p_y) \\ p_x * (r_x - q_x) + p_y * (r_y - q_y) \end{bmatrix} \tag{16}$$

After the terminal device obtains $u_x$ (that is, the optical center abscissa) and $u_y$ (that is, the optical center ordinate), $u_x$ and $u_y$ may be substituted into the foregoing Formula (12), and Formula (17) for calculating the focal length f may be obtained:

$$f = \sqrt{-(p_x - u_x)(q_x - u_x) - (p_y - u_y)(p_y - u_y)} \tag{17}$$

In some embodiments, after the terminal device obtains $u_x$ and $u_y$, $u_x$ and $u_y$ may also be substituted into the foregoing Formula (13) or Formula (14), and the focal length f is calculated by using Formula (13) or Formula (14). For a specific process of calculating the focal length f by using Formula (13) or Formula (14), reference may be made to the description of calculating the focal length f by using Formula (12). Details are not described herein again.

It may be seen that in this embodiment of this disclosure, the vanishing point coordinates of the vanishing point indicated by the vanishing point identifier may be generated based on the vanishing point identifier and the straight line equation, then the space division straight lines are screened based on the included angles between every two spatial virtual straight lines in the space division straight lines, so as to obtain the space division straight line that satisfies the vanishing point qualification condition, and then the intrinsic component parameter of the camera component is generated based on the vanishing point coordinates corresponding to the space division straight line that satisfies the vanishing point qualification condition. The manner of determining the intrinsic component parameter based on the vanishing point coordinates provided in this embodiment of this disclosure may reduce the speed and costs of calibrating the intrinsic component parameter.

Figure 15:
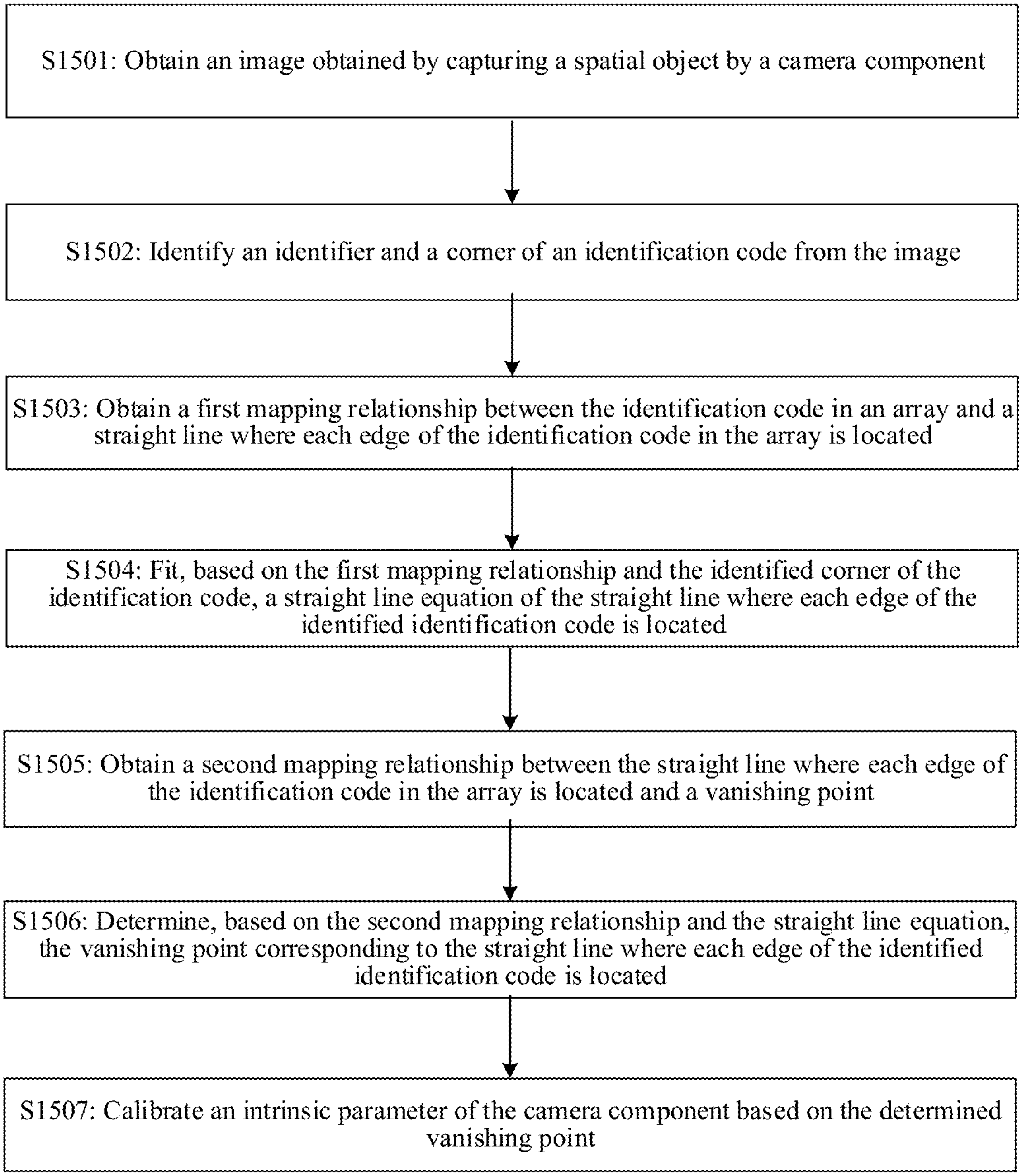
FIG. 15 shows a flowchart of a data processing method 1500 according to an embodiment of this disclosure.

FIG. 15 shows a flowchart of a data processing method 1500 according to an embodiment of this disclosure. The data processing method 1500 is performed by a computer device.

As shown in FIG. 15, the data processing method may include the following steps. Step S1501: Obtain an image obtained by shooting a spatial object by a camera component. The spatial object includes any one of the following: a planar region, two planar regions perpendicular to each other, and three planar regions perpendicular to each other. For example, the spatial object is at least one of a left wall 21*a*, a right wall 21*b*, and a ground region 21*c* as shown in FIG. 2*a*. Each planar region includes an array composed of a plurality of identification codes, each of the identification codes carrying information with an identifiable unique identifier. The identification code is, for example, a two-dimensional code.

Step S1502: Identify an identifier and a corner of the identification code from the image. The identified corner of the identification code is an identified corner on each edge of the identification code. In step S1502 herein, an identification code detection algorithm may be used to detect an identifiable identification code in the image. Each edge of a rectangular outline (or a bounding rectangle) of the identification code may be considered as each edge of the identification code.

Step S1503: Obtain a first mapping relationship between the identification code in the array and a straight line where each edge of the identification code in the array is located. In an embodiment, each edge of the identification code in the array may be parallel to a coordinate axis in a first three-dimensional rectangular coordinate system. In the first three-dimensional rectangular coordinate system, a first coordinate axis and a second coordinate axis are in an image plane, and a third coordinate axis is perpendicular to the image plane. A two-dimensional coordinate system composed of the first coordinate axis and the second coordinate axis may be, for example, used as a pixel coordinate system of the image.

Step S1504: Fit, based on the first mapping relationship and the identified corner of the identification code, a straight line equation of the straight line where each edge of the identified identification code is located.

Step S1505: Obtain a second mapping relationship between the straight line where each edge of the identification code in the array is located and a vanishing point. The vanishing point herein represents a visual intersection point of parallel lines in the real world in the image. A group of straight lines parallel to each other in the straight lines where the edges of the identification codes in the array are located correspond to the same vanishing point.

Step S1506: Determine, based on the second mapping relationship and the straight line equation, the vanishing point corresponding to the straight line where each edge of the identified identification code is located.

Step S1507: Calibrate an intrinsic parameter of the camera component based on the determined vanishing point. The determined vanishing point herein is, for example, 2 or 3.

Based on the above, according to the solution of the embodiments of this disclosure, the calibration of the intrinsic camera parameter may be implemented by using the single image captured by the spatial object including the identifiable identification code. In particular, because the identification code is identifiable, according to the solutions of the embodiments of this disclosure, the identification codes at a plurality of angles to the camera (for example, identification codes corresponding to two planar regions or three planar regions perpendicular to each other) may be obtained from the single image, and distribution information of the identified identification code (a corner of each edge) is used to determine the corner of each edge of the identification code on the straight line in the image, so that the straight line where each edge in the image is located can be determined (for example, the straight line is represented by using the straight line equation). Further, the determined straight line may be used to determine the vanishing point, so that the vanishing point may be used to calibrate the content of the camera. In this way, according to the solutions of the embodiments of this disclosure, the trouble that checkerboard images need to be captured from a plurality of angles to calibrate the intrinsic camera parameter in the conventional calibration scheme (for example, a manner of calibration by using a checkerboard) may be avoided, thereby reducing capturing requirements for image data and improving efficiency and convenience of calibration of the intrinsic camera parameter.

In addition, because the identification code is identifiable, in this embodiment of this disclosure, the first mapping relationship (the first mapping relationship may also be actually considered to represent the mapping relationship between the corner of each edge of the identification code and the straight line) between the identifier of the identification code and the straight line where each edge of the identification code is located, and the second mapping relationship between the straight line where each edge is located and the vanishing point may be established before the method 1500 is performed. On this basis, in this embodiment of this disclosure, the first mapping relationship and the second mapping relationship do not need to be obtained by using the image during performing of the method 1500, and the first mapping relationship and the second mapping relationship may be predetermined, thereby further improving data processing efficiency of the computer device during calibration of the intrinsic camera parameter.

In an embodiment, the identification code in the array is a two-dimensional code. In step S1502, the identification code in the image may be detected to identify the identifier of the identification code and coordinates of the identified corner of each edge of the identification code. Each edge of the identification code is each edge of a bounding rectangle of the identification code.

In an embodiment, in step S1503, the first table for representing the first mapping relationship may be obtained. The first table is used for representing a correspondence between the identifier of the identification code in the array and the identifier of the straight line where each edge of the identification code in the array is located. The first table herein is, for example, the table $T_1$ above.

In an embodiment, the first table is created before the image is obtained, and a manner of creating the first table includes:

storing, in the first table based on a distribution of the identification codes in the array of each planar region in the spatial object, the identifier of the identification code in the array in association with the identifier of the straight line where each edge of the identification code in the array is located. Herein, the first mapping relationship is obtained from the pre-established first table, so that the efficiency of data processing during the calibration of the intrinsic camera parameter may be improved in this embodiment of this disclosure. The straight line where each edge is located may be, for example, the spatial virtual straight line above.

In an embodiment, the obtaining a second mapping relationship between the straight line where each edge of the identification code in the array is located and a vanishing point includes:

- obtaining a second table for representing the second mapping relationship, the second table being used for representing a correspondence between the identifier of the straight line where each edge of the identification code in the array is located and an identifier of the vanishing point. Herein, the second mapping relationship is obtained from the pre-established second table, so that the efficiency of data processing during the calibration of the intrinsic camera parameter may be improved in this embodiment of this disclosure.

In an embodiment, the second table corresponds to two vanishing points or three vanishing points.

In a case that the second table corresponds to two vanishing points, the two vanishing points includes a first vanishing point and a second vanishing point. A straight line corresponding to the first vanishing point is parallel to a first coordinate axis in a first three-dimensional rectangular coordinate system, and a straight line corresponding to the second vanishing point is parallel to a second coordinate axis in the first three-dimensional rectangular coordinate system.

In a case that the second table corresponds to three vanishing points, the three vanishing points include a first vanishing point, a second vanishing point, and a third vanishing point. The straight line corresponding to the first vanishing point is parallel to the first coordinate axis in the first three-dimensional rectangular coordinate system, the straight line corresponding to the second vanishing point is parallel to the second coordinate axis in the first three-dimensional rectangular coordinate system, and a straight line corresponding to the third vanishing point is parallel to a third coordinate axis in the first three-dimensional rectangular coordinate system. The first coordinate axis and the second coordinate axis in the first three-dimensional rectangular coordinate system are in an image plane, and the third coordinate axis is perpendicular to the image plane.

In an embodiment, the second table is created before the image is obtained, and a manner of creating the second table includes:

- grouping, based on the distribution of the identification codes in the array of each planar region in the spatial object, the straight lines where the edges of the identification codes in the array are located, to obtain at least two groups, the straight lines in each group being parallel to each other, and the straight lines in different groups being perpendicular to each other;
- assigning the identifier of the vanishing point to the straight lines in each group, the straight lines in a single group corresponding to the identifier of the same vanishing point; and
- creating, based on the identifier of the vanishing point assigned to the straight lines in each group, the second table representing the second mapping relationship. The second table herein is, for example, the table $T_2$ above.

In an embodiment, S1504 may be implemented as the following steps:

S1: Query, based on the first mapping relationship, for the straight line where each edge of the identified identification code is located. For example, in S1, the identifier of the straight line corresponding to each edge of the identification code may be found.

S2: Assign the corner of each edge of the identified identification code to the found straight line where each edge is located. For example, for an edge of the identification code, in S2, a corner on the edge may be assigned to the straight line where the edge is located.

S3: Fit, for each straight line corresponding to the identifier of the found straight line, a straight line equation of the straight line by using the corner assigned to the straight line. In other words, for each straight line, in S3, the corner on the straight line may be used to fit the straight line equation of the straight line.

Based on the above, in S1504, the first mapping relationship may be used to assign the corner to the found straight line. A corner assigned to a straight line is the corner on the straight line, so that a plurality of corners on the straight line may be used to fit the straight line equation of the straight line.

In an embodiment, S1506 may be implemented by: determining the identifier of the vanishing point corresponding to each straight line equation based on the second mapping relationship; and determining, for the determined identifier of each vanishing point, coordinates of the corresponding vanishing point in the image plane based on the straight line equation corresponding to the identifier of the vanishing point. Herein, in S1506, an intersection point of the straight lines represented by a plurality of straight line equations in the image may be used as the vanishing point.

In an embodiment, before the determining, for the determined identifier of each vanishing point, coordinates of the corresponding vanishing point in the image plane based on the straight line equation corresponding to the identifier of the vanishing point, the method 1500 further includes: determining, for the determined identifier of each vanishing point, a maximum included angle between the straight lines represented by the straight line equation corresponding to the identifier of the vanishing point; and deleting an identifier of a vanishing point from the determined identifiers of the vanishing points corresponding to the straight line equations in a case that the maximum included angle corresponding to the straight line equation corresponding to the identifier of the vanishing point is less than a first threshold. Herein, the first threshold may be set as required, for example, 5 degrees, but is not limited thereto. In this way, the identifier of the vanishing point is deleted to implement selection of the vanishing point, to avoid using the unqualified vanishing point (that is, the vanishing point corresponding to a case where the maximum included angle is less than the first threshold) to calibrate the intrinsic camera parameter, thereby improving accuracy of the calibration of the intrinsic parameter.

In an embodiment, before the determining, for the determined identifier of each vanishing point, coordinates of the corresponding vanishing point in the image plane based on the straight line equation corresponding to the identifier of the vanishing point, the method 1500 may further include:

determining, for the determined identifier of each vanishing point, whether a quantity of straight line equations corresponding to the identifier of the vanishing point reaches a second threshold; and deleting an identifier of a vanishing point from the determined identifiers of the vanishing point corresponding to each straight line equation in a case that the quantity of straight line equations corresponding to the identifier of the vanishing point is less than the second threshold.

The second threshold herein is, for example, 2. When the quantity of straight line equations corresponding to one identifier does not reach the second threshold, the coordinates of the corresponding vanishing point cannot be calculated actually. Therefore, the identifier of the vanishing point is deleted from the determined identifiers of the vanishing points in this disclosure, to avoid invalid calculation, thereby improving data processing efficiency.

In an embodiment, S1507 may be implemented as the following steps:

S11: Determine coordinates of an optical center of the camera component based on a height and a width of the image. For example, assuming that coordinates of the optical center are $(u_x, u_y)$, the width and the height of the image are denoted as w and h, and optical center coordinates of the camera are: $u_x=w/2$, and $u_y=h/2$.

S12: Determine a vector of each vanishing point, the vector of each vanishing point being a vector between each vanishing point and the optical center of the camera component, the vectors of different vanishing points being perpendicular to each other.

S13: Determine a focal length of the camera component based on the vector of each vanishing point.

For example, in a two-dimensional xy coordinate system of a focal plane of the camera (that is, the image plane), a right-handed rectangular coordinate system is established by using a direction along a camera focus toward the optical center as a z-axis, that is, the first three-dimensional rectangular coordinate system above.

In the coordinate system, coordinates of the camera focus $c_f$ are denoted as $(u_x, u_y, -f)$, and coordinates of an optical center c are denoted as $(u_x, u_y, 0)$. A total of two vanishing points exist in S13, where coordinates p of a vanishing point 1 are $(p_x, P_y, -f)$, and coordinates q of a vanishing point 2 are $(q_x, q_y, -f)$.

Because two groups of parallel lines in a 3D space are perpendicular to each other, a vector $\vec{v}_1$ (the vector is parallel to a group of parallel lines) from the optical center c of the camera to the vanishing point 1 is perpendicular to a vector $\vec{v}_2$ (the vector is parallel to another group of parallel lines) from the optical center c to the vanishing point 2, that is, $\vec{v}_1 \cdot \vec{v}_2=0$. A constraint equation is obtained by expansion:

$$(p_x-u_x)(q_x-u_x)+(p_y-u_y)(q_y-u_y)+f^2=0$$

Based on the foregoing equation, a value of a focal length f may be calculated:

$$f=\sqrt{-(p_x-u_x)(q_x-u_x)-(p_y-u_y)(q_y-u_y)}$$

In an embodiment, a total of three vanishing points exist in S13. The coordinates p of the vanishing point 1 are $(p_x, P_y, 0)$, the coordinates q of the vanishing point 2 are $(q_x, q_y, 0)$, and coordinates r of a vanishing point 3 are $(r_x, r_y, 0)$.

In this embodiment of this disclosure, the focal length f may be calculated based on the following formula:

$$f=\sqrt{-(p_x-u_x)(q_x-u_x)-(p_y-u_y)(q_y-u_y)}$$

Figure 16:
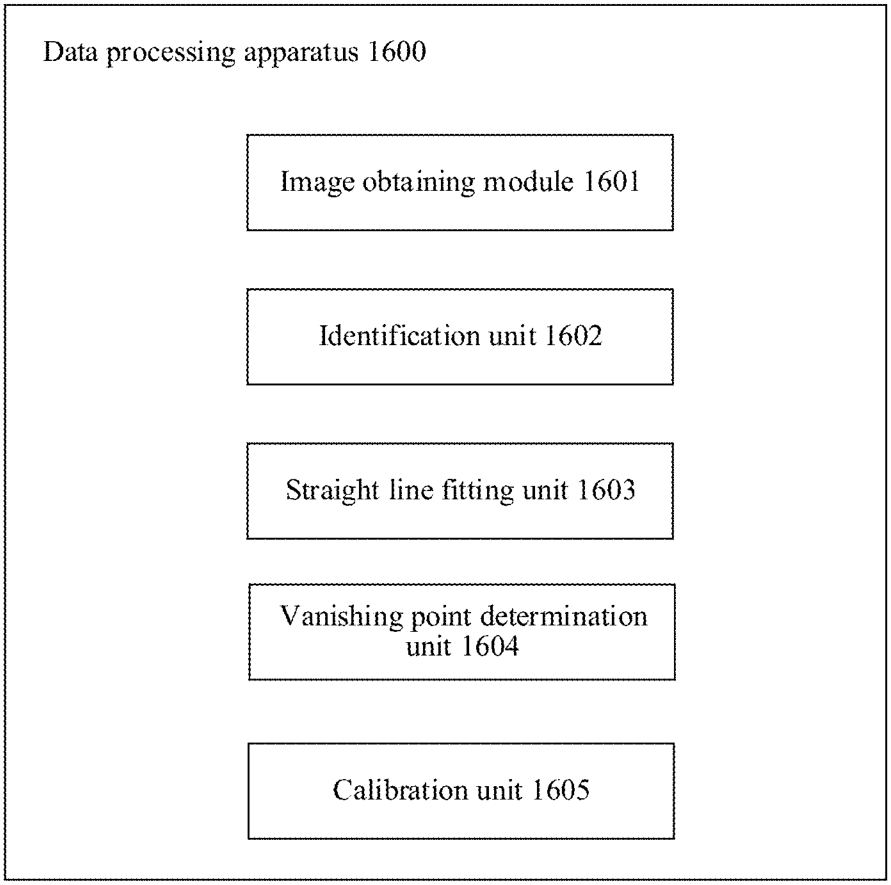
FIG. 16 is a schematic structural diagram of a data processing apparatus according to an embodiment of this disclosure.

Further, FIG. 16 is a schematic structural diagram of a data processing apparatus 1600 according to an embodiment of this disclosure. The data processing apparatus 1600 may include: an image obtaining module 1601, an identification unit 1602, a straight line fitting unit 1603, a vanishing point determination unit 1604, and a calibration unit 1605.

The image obtaining module 1601 is configured to obtain an image obtained by shooting a spatial object by a camera component, the spatial object including two planar regions or three planar regions perpendicular to each other, each planar region including an array composed of a plurality of identification codes, each of the identification codes carrying information with an identifiable unique identifier.

The identification unit 1602 is configured to identify an identifier and a corner of the identification code from the image, the identified corner of the identification code being an identified corner on each edge of the identification code.

The straight line fitting unit 1603 is configured to: obtain a first mapping relationship between the identification code in the array and a straight line where each edge of the identification code in the array is located, and fit, based on the first mapping relationship and the identified corner of the identification code, a straight line equation of the straight line where each edge of the identified identification code is located.

The vanishing point determination unit 1604 is configured to: obtain a second mapping relationship between the straight line where each edge of the identification code in the array is located and a vanishing point; and determine, based on the second mapping relationship and the straight line equation, the vanishing point corresponding to the straight line where each edge of the identified identification code is located.

The calibration unit 1605 is configured to calibrate an intrinsic parameter of the camera component based on the determined vanishing point.

Based on the above, according to the solution of the embodiments of this disclosure, the calibration of the intrinsic camera parameter may be implemented by using the single image captured by the spatial object including the identifiable identification code. In particular, because the identification code is identifiable, according to the solutions of the embodiments of this disclosure, the identification codes at a plurality of angles to the camera (for example, identification codes corresponding to two planar regions or three planar regions perpendicular to each other) may be obtained from the single image, and distribution information of the identified identification code (a corner of each edge) is used to determine the corner of each edge of the identification code on the straight line, so that the straight line where each edge is located can be determined (for example, the straight line is represented by using the straight line equation). Further, the determined straight line may be used to determine the vanishing point, so that the vanishing point may be used to calibrate the content of the camera. In this way, according to the solutions of the embodiments of this disclosure, the trouble that checkerboard images need to be captured from a plurality of angles to calibrate the intrinsic camera parameter in the conventional calibration scheme (for example, a manner of calibration by using a checkerboard) may be avoided, thereby reducing capturing requirements for image data and improving efficiency and convenience of calibration of the intrinsic camera parameter.

Figure 17:
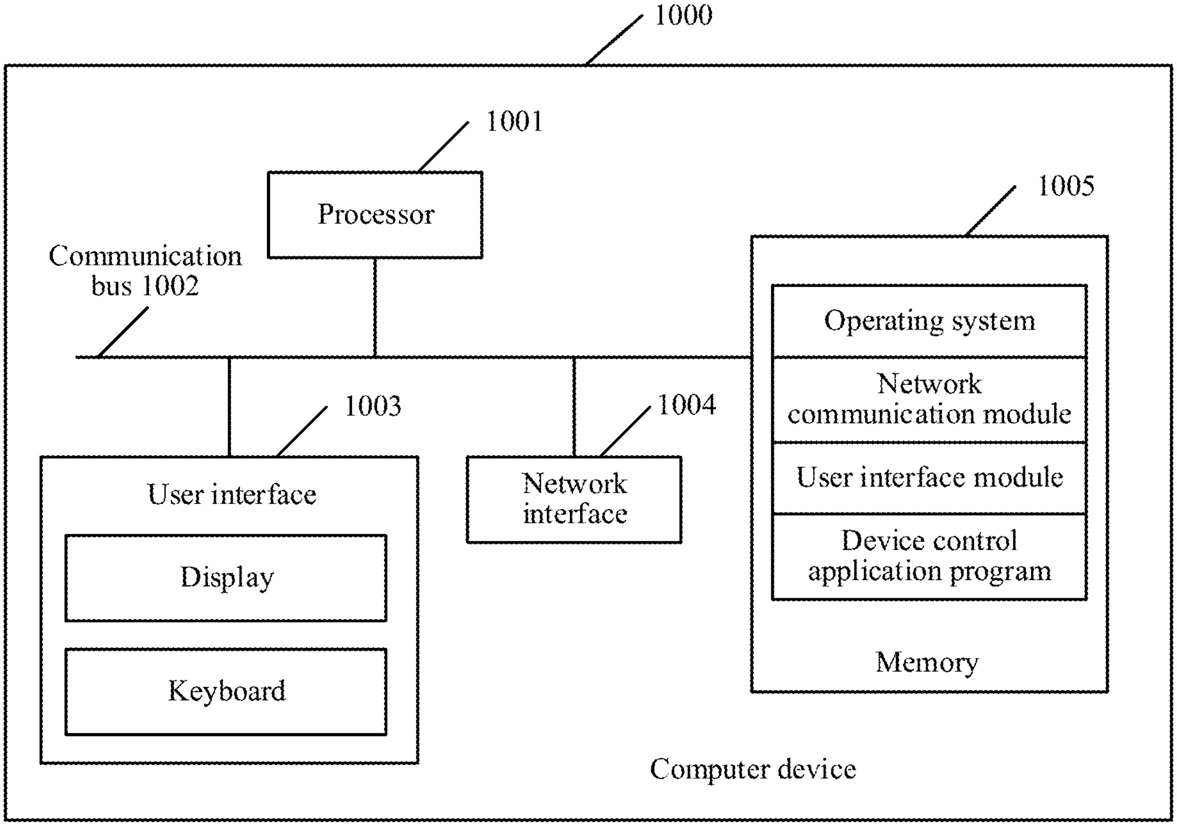
FIG. 17 is a schematic structural diagram of a computer device according to an embodiment of this disclosure.

Further, FIG. 17 is a schematic structural diagram of a computer device according to an embodiment of this disclosure. A computer device 1000 shown in FIG. 17 may be the server or the terminal device in the foregoing embodiments. The computer device 1000 may include a processor 1001, a network interface 1004, and a memory 1005. In addition, the foregoing computer device 1000 may further include a user interface 1003 and at least one communication bus 1002. The communication bus 1002 is configured to implement connection and communication between these components. In some embodiments, the user interface 1003 may include a display and a keyboard. In some embodiments, the user interface 1003 may further include a standard wired interface and a wireless interface. In some embodiments, the network interface 1004 may include a standard wired interface and a wireless interface (such as a Wi-Fi interface). The memory 1005 may be a high-speed RAM memory, or may be a non-volatile memory, for example, at least one magnetic disk memory. In some embodiments, the memory 1005 may alternatively be at least one storage apparatus located away from the foregoing processor 1001. As shown in FIG. 17, as a computer-readable storage medium, the memory 1005 may include an operating system, a network communication module, a user interface module, and a device control application program.

In the computer device 1000 shown in FIG. 17, the network interface 1004 may provide a network communication function, the user interface 1003 is mainly configured to provide an input interface for a user, and the processor 1001 may be configured to invoke a device control application program stored in the memory 1005, to implement the data processing method according to the embodiments of this disclosure.

It is to be understood that the computer device 1000 described in this embodiment of this disclosure may perform the description of the data processing method in the embodiments corresponding to FIG. 3, FIG. 7, FIG. 10, FIG. 12, and FIG. 14, and may also perform the description of the data processing apparatus 1 in the foregoing embodiment corresponding to FIG. 15, and details are not described herein again. In addition, for the description of the beneficial effects of using the same method, details are not described again.

Moreover, an embodiment of this disclosure further provides a computer-readable storage medium, such as a non-transitory computer-readable storage medium. The computer-readable storage medium stores the computer program executed by the data processing apparatus 1 mentioned above, for example. When the processor executes the computer program, the description of the data processing method in the foregoing embodiments corresponding to FIG. 3, FIG. 7, FIG. 10, FIG. 12, FIG. 14, and FIG. 15 can be performed. Therefore, details are not described herein again. In addition, for the description of the beneficial effects of using the same method, details are not described again. For technical details that are not disclosed in the embodiment of the computer-readable storage medium involved in this disclosure, reference is made to the description of the method embodiment of this disclosure.

In addition, an embodiment of this disclosure further provides a computer program product. The computer program product may include a computer program, and the computer program may be stored in a computer-readable storage medium. A processor of a computer device reads the computer program from the computer-readable storage medium, and the processor may execute the computer program, so that the computer device performs the description of the data processing method in the foregoing embodiments corresponding to FIG. 3, FIG. 7, FIG. 10, FIG. 12, FIG. 14, and FIG. 15. Therefore, details are not described herein again. In addition, for the description of the beneficial effects of using the same method, details are not described again.

For technical details that are not disclosed in the embodiment of the computer program product involved in this disclosure, reference is made to the description of the method embodiment of this disclosure.

It is noted that all or some of the processes of the method in the foregoing embodiments may be implemented by using a computer program instructing relevant hardware. The computer program may be stored in a computer-readable storage medium. When the program is executed, the processes of the foregoing method embodiments may be performed. The storage medium may be a magnetic disk, an optical disk, a read-only memory (ROM), a random access memory (RAM), or the like.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

What is disclosed above is merely exemplary embodiments of this disclosure, and is not intended to limit the scope of the claims of this disclosure. Therefore, equivalent variations made in accordance with the claims of this disclosure still fall within the scope of this disclosure.

What is claimed is:

1. A method of data processing, comprising:

obtaining an image of a spatial object in a space, the spatial object being captured in the image by a camera component, the image comprising one or more captured planar regions corresponding to one or more planes of the spatial object, a first captured planar region of the one or more captured planar regions comprising an array of first captured identification codes that are individually identifiable and comprising first captured straight lines, the first captured straight lines being associated with the first captured identification codes according to a first mapping relationship, the first captured straight lines in the image being associated with a first vanishing point;

identifying the first captured identification codes from the image;

identifying the first captured straight lines in the image based on the first mapping relationship;

determining first equations of the first captured straight lines in the image based on coordinates of captured points on the first captured straight lines in the image;

determining, based on the first equations of the first captured straight lines, coordinates of the first vanishing point; and determining one or more intrinsic parameters of the camera component based on at least the first vanishing point, the one or more intrinsic parameters comprising coordinates of an optical center of the camera component and a focal length of the camera component that is determined based on the coordinates of the optical center and at least the first vanishing point.

2. The method according to claim 1, wherein the first captured identification codes in the array correspond to two-dimensional codes with bounding rectangles on a plane of the one or more planes and the identifying the first captured identification codes comprises:

detecting an identification code corresponding to a two-dimensional code to determine an identifier for the identification code; and detecting, in the image, coordinates of corners of edges of the identification code, the edges corresponding to a bounding rectangle of the two-dimensional code in the plane.

3. The method according to claim 1, further comprising:

obtaining a first table for representing the first mapping relationship.

4. The method according to claim 3, wherein the first table is pre-generated according to a distribution of identification codes on the one or more planes, and the method further comprises:

storing, in the first table, a relationship of an identifier of an identification code to identifiers of straight lines that form edges of the identification code.

5. The method according to claim 1, further comprising:

obtaining a second table that includes a second mapping relationship between identifiers of the first captured straight lines and an identifier of the first vanishing point.

6. The method according to claim 5, wherein the second table includes the second mapping relationship of captured straight lines to the first vanishing point and a second vanishing point, a first captured straight line mapping to the first vanishing point corresponds to a first straight line in the space that is parallel to a first coordinate axis in the space, and a second captured straight line mapping the second vanishing point corresponds to a second straight line in the space that is parallel to a second coordinate axis in the space.

7. The method according to claim 5, wherein the second table includes the second mapping relationship of captured straight lines to the first vanishing point, a second vanishing point, and a third vanishing point, a first captured straight line mapping to the first vanishing point corresponds to a first straight line in the space that is parallel to a first coordinate axis in the space, a second captured straight line mapping the second vanishing point corresponds to a second straight line in the space that is parallel to a second coordinate axis in the space, a third captured straight line mapping the third vanishing point corresponds to a third straight line in the space that is parallel to a third coordinate axis in the space, the third coordinate axis is perpendicular to a plane formed by the first coordinate axis and the second coordinate axis.

8. The method according to claim 5, wherein the second table is predefined based on a distribution of identification codes on the one or more planes, and the method further comprises:

grouping, straight lines that form edges for the identification codes into groups based on parallelism, first parallel straight lines in a first plane being grouped into a first group and second parallel straight lines in the first plane being grouped into a second group, the first parallel straight lines being perpendicular to the second parallel straight lines;

assigning identifiers of vanishing points to straight lines, a first identifier of a vanishing point being assigned to the first parallel straight lines in the first group and a second identifier of another vanishing point being assigned to the second parallel straight lines in the second group; and creating the second table to include a mapping relationship of identifiers of the straight lines to the identifiers of the vanishing points.

9. The method according to claim 1, wherein the determining the first equations comprises:

determining, based on the first mapping relationship, the first captured straight lines that respectively include edges of the first captured identification codes;

assigning corners of the edges to the first captured straight lines; and fitting, for a straight line in the first captured straight lines, a straight line equation using a plurality of corners that are assigned to the straight line.

10. The method according to claim 1, further comprising:

determining, for each captured straight line of captured straight lines for corresponding straight lines in the space, an identifier of a vanishing point associated with the captured straight line based on a second mapping relationship of the corresponding straight lines in the space to vanishing points; and determining, for an identifier of a vanishing point, coordinates of the vanishing point based on equations of the captured straight lines associated with the identifier of the vanishing point.

11. The method according to claim 1, further comprising:

determining, for the first vanishing point, a maximum included angle between the first captured straight lines associated with the first vanishing point; and disregarding the first vanishing point from the determining the one or more intrinsic parameters of the camera component when the maximum included angle is less than a first threshold.

12. The method according to claim 10, further comprising:

determining, for a vanishing point, whether a quantity of equations of captured straight lines associated with the identifier of the vanishing point reaches a second threshold; and disregarding the vanishing point from the determining the one or more intrinsic parameters of the camera component when the quantity of the equations is less than the second threshold.

13. An apparatus of data processing, comprising processing circuitry configured to:

obtain an image of a spatial object in a space, the spatial object being captured in the image by a camera component, the image comprising one or more captured planar regions corresponding to one or more planes of the spatial object, a first captured planar region of the one or more captured planar regions comprising an array of first captured identification codes that are individually identifiable and comprising first captured straight lines, the first captured straight lines being associated with the first captured identification codes according to a first mapping relationship, the first captured straight lines in the image being associated with a first vanishing point;

identify the first captured identification codes from the image;

identify the first captured straight lines in the image based on the first mapping relationship;

determine first equations of the first captured straight lines in the image based on coordinates of captured points on the first captured straight lines in the image;

determine, based on the first equations of the first captured straight lines, coordinates of the first vanishing point; and determine one or more intrinsic parameters of the camera component based on at least the first vanishing point, the one or more intrinsic parameters comprising coordinates of an optical center of the camera component and a focal length of the camera component that is determined based on the coordinates of the optical center and at least the first vanishing point.

14. The apparatus according to claim 13, wherein the first captured identification codes in the array correspond to two-dimensional codes with bounding rectangles on a plane of the one or more planes and the processing circuitry is configured to:

detect an identification code corresponding to a two-dimensional code to determine an identifier for the identification code; and detect, in the image, coordinates of corners of edges of the identification code, the edges corresponding to a bounding rectangle of the two-dimensional code in the plane.

15. The apparatus according to claim 13, wherein the processing circuitry is configured to:

obtain a first table for representing the first mapping relationship.

16. The apparatus according to claim 15, wherein the first table is pre-generated according to a distribution of identification codes on the one or more planes, and the processing circuitry is configured to:

store, in the first table, a relationship of an identifier of an identification code to identifiers of straight lines that form edges of the identification code.

17. The apparatus according to claim 13, wherein the processing circuitry is configured to:

obtain a second table that includes a second mapping relationship between identifiers of the first captured straight lines and an identifier of the first vanishing point.

18. The apparatus according to claim 17, wherein the second table includes the second mapping relationship of captured straight lines to the first vanishing point and a second vanishing point, a first captured straight line mapping to the first vanishing point corresponds to a first straight line in the space that is parallel to a first coordinate axis in the space, and a second captured straight line mapping the second vanishing point corresponds to a second straight line in the space that is parallel to a second coordinate axis in the space.

19. A non-transitory computer-readable storage medium storing instructions which when executed by at least one processor cause the at least one processor to perform:

obtaining an image of a spatial object in a space, the spatial object being captured in the image by a camera component, the image comprising one or more captured planar regions corresponding to one or more planes of the spatial object, a first captured planar region of the one or more captured planar regions comprising an array of first captured identification codes that are individually identifiable and comprising first captured straight lines, the first captured straight lines being associated with the first captured identification codes according to a first mapping relationship, the first captured straight lines in the image being associated with a first vanishing point;

identifying the first captured identification codes from the image;

identifying the first captured straight lines in the image based on the first mapping relationship;

determining first equations of the first captured straight lines in the image based on coordinates of captured points on the first captured straight lines in the image;

determining, based on the first equations of the first captured straight lines, coordinates of the first vanishing point; and determining one or more intrinsic parameters of the camera component based on at least the first vanishing point, the one or more intrinsic parameters comprising coordinates of an optical center of the camera component and a focal length of the camera component that is determined based on the coordinates of the optical center and at least the first vanishing point.

* * * * *